(12) United States Patent
Magee

(10) Patent No.: US 9,567,016 B2
(45) Date of Patent: Feb. 14, 2017

(54) WHEEL FAIRING DEFLECTING WIND ONTO LOWER WHEEL

(71) Applicant: Garth L. Magee, Hawthorne, CA (US)

(72) Inventor: Garth L. Magee, Hawthorne, CA (US)

(*) Notice: Subject to any disclaimer, the term of this patent is extended or adjusted under 35 U.S.C. 154(b) by 0 days.

(21) Appl. No.: 14/314,501

(22) Filed: Jun. 25, 2014

(65) Prior Publication Data
US 2015/0375811 A1    Dec. 31, 2015

(51) Int. Cl.
*B62D 35/00*    (2006.01)
*B62D 35/02*    (2006.01)

(52) U.S. Cl.
CPC .............. *B62D 35/02* (2013.01); *B62D 35/001* (2013.01)

(58) Field of Classification Search
CPC ....................................................... B62D 35/02
USPC ............................................ 296/180.1–180.5
See application file for complete search history.

(56) References Cited

U.S. PATENT DOCUMENTS

| | | |
|---|---|---|
| 449,220 A | 3/1891 | Jeffrey |
| 622,997 A | 4/1899 | Diehl |
| 1,027,806 A | 5/1912 | Blake |
| 2,460,349 A | 7/1947 | Hessler |
| 3,101,163 A | 8/1963 | Huber |
| 4,027,836 A | 6/1977 | Seibel |
| 4,262,953 A | 4/1981 | McErlane |
| 4,326,728 A | 4/1982 | Tatch |
| 4,411,443 A | 10/1983 | Pollard |
| 4,486,046 A * | 12/1984 | Whitney ............... B62D 35/001 280/851 |
| 4,640,541 A * | 2/1987 | FitzGerald ........... B62D 35/001 280/851 |
| 4,773,663 A | 9/1988 | Sawyer |
| 4,919,490 A | 4/1990 | Hopkins |
| 4,930,844 A | 6/1990 | Giroux |
| 5,061,013 A | 10/1991 | Hed |
| D323,306 S | 1/1992 | Brummer |
| 5,080,444 A | 1/1992 | Hopkins |
| 5,246,275 A | 9/1993 | Arredondo |
| 5,280,990 A | 1/1994 | Rinard |
| 5,348,328 A | 9/1994 | Millington |
| D377,158 S | 1/1997 | Grimaldi |
| D396,441 S | 7/1998 | Nishida |
| 5,779,323 A | 7/1998 | Burrows |

(Continued)

FOREIGN PATENT DOCUMENTS

| | | |
|---|---|---|
| WO | 2014099197 | 6/2014 |
| WO | 2015/037552 | 12/2015 |
| WO | 2015032912 | 12/2015 |

OTHER PUBLICATIONS

Sunter & Sayers, Aerodynamic Drag Mountain Bike Tyres, Sports Engineering, 2001, 4, 63-73.

(Continued)

*Primary Examiner* — Joshua Kennedy

(57) ABSTRACT

An upper wheel fairing assembly for increasing the propulsive efficiency of a wheeled vehicle having wheels otherwise exposed to headwinds, comprising a deflector panel or skirt panel assembly mounted upstream in front of a rearward wheel set, ideally extending downward to not lower than the level of the axle, and arranged to deflect headwinds from impinging upon the high drag-inducing mechanically advantaged upper wheel surfaces downward onto the low drag-inducing mechanically disadvantaged lower wheel surfaces.

87 Claims, 19 Drawing Sheets

(56) References Cited

U.S. PATENT DOCUMENTS

| | | | |
|---|---|---|---|
| 5,921,617 A | 7/1999 | Loewen | |
| 6,017,076 A | 1/2000 | Belisle | |
| 6,086,161 A | 7/2000 | Luttgeharm | |
| D451,877 S | 12/2001 | Lee | |
| 6,325,462 B1 | 12/2001 | Humel | |
| D460,942 S | 7/2002 | Lee | |
| 6,446,994 B1 | 9/2002 | Smerdon | |
| 6,644,720 B2 | 11/2003 | Long | |
| D500,003 S | 12/2004 | Guevara | |
| 6,913,323 B2 | 7/2005 | Bhambra | |
| 6,974,178 B2 | 12/2005 | Ortega | |
| 7,093,889 B2 * | 8/2006 | Graham | B62D 35/001 296/180.1 |
| 7,322,592 B2 | 1/2008 | Francis | |
| 7,497,502 B2 * | 3/2009 | Wood | B62D 35/001 296/180.1 |
| 7,520,534 B2 | 4/2009 | Longchamp | |
| 7,578,541 B2 | 8/2009 | Layfield | |
| D612,781 S | 3/2010 | Harrell | |
| 7,748,772 B2 * | 7/2010 | Boivin | B60R 13/0861 180/903 |
| 7,806,464 B2 * | 10/2010 | Cardolle | B62D 35/001 296/180.1 |
| 7,854,469 B2 * | 12/2010 | Dayton | B62D 35/001 296/180.1 |
| 7,887,120 B2 | 2/2011 | Boivin | |
| D634,249 S | 3/2011 | Dallaire | |
| 7,942,471 B2 | 5/2011 | Boivin | |
| 7,997,640 B1 | 8/2011 | Wurm | |
| 8,251,436 B2 | 8/2012 | Henderson | |
| 8,276,972 B2 | 10/2012 | Domo | |
| 8,303,025 B2 | 11/2012 | Senatro | |
| 8,322,778 B1 * | 12/2012 | Pfaff | B62D 35/001 296/180.4 |
| D673,494 S | 1/2013 | Lemke | |
| 8,342,595 B2 | 1/2013 | Henderon | |
| 8,616,616 B2 * | 12/2013 | van Raemdonck | B62D 35/008 296/180.4 |
| 8,944,490 B2 | 2/2015 | Johnson et al. | |
| 9,979,102 | 3/2015 | Prentice | |
| 2006/0152038 A1 | 7/2006 | Graham | |
| 2006/0252361 A1 * | 11/2006 | Henderson, II | B62D 35/001 454/118 |
| 2007/0151644 A1 | 7/2007 | Matthews | |
| 2009/0212595 A1 | 8/2009 | Heppel | |
| 2009/0236902 A1 | 9/2009 | Zibkoff | |
| 2010/0066123 A1 | 3/2010 | Ortega | |
| 2010/0327625 A1 | 12/2010 | Tavlarides | |
| 2011/0080019 A1 | 4/2011 | Castillo | |
| 2011/0204677 A1 * | 8/2011 | Wood | B62D 35/001 296/180.1 |
| 2014/0265431 A1 | 9/2014 | Magee | |
| 2015/0076860 A1 * | 3/2015 | Rettig | B62D 35/02 296/180.5 |
| 2015/0346051 A1 | 12/2015 | Magee | |

OTHER PUBLICATIONS

Kyle, Aerodynamic Wheels, Bicycling, Dec. 1985, 121-124.
Greenwell, Aerodynamic characteristics of low-drag bicycle wheels, Aeronautical Journal, 1995, 99, 109-120.
Moore, Translational and rotational aerodynamic drag . . . , Proc. of Inst. of Mech. Engrs, Part P: Jml of Sports Eng., Jun. 1, 2008, V222, 2 ,91-102.
Forrester, On the Aerodynamics of Bicycle Wheels, School of Eng. Sciences, Univ. of Southhampton, UK, Jan. 2, 2008.
Kyle, Improving the Racing Bicycle, Mechanical Engineering, Sep. 1984, 106 (9), 35-45.
Kyle, Aerodynamics of human-powered vehicles, Proc. of Inst. Mech. Eng., 2004, V218, Part A, 141-154.
Gross, The Aerodynamics of Human-powered Land Vehicles, Scientific American,1983, 249 (6), 126-134.
Lukes, The understanding and development of cycling aerodynamics, Sports Engineering (2005) 8, 59-74.
Godo, An Aerodynamic Study of Bicycle Wheel Performance using CFD, AIAA Aerospace Science Mtg, 2009-322, Jan. 5-8, 2009.
Zdrakovich, Aerodynamics of bicycle wheel and frame, Jml of Wind Eng. & Industrial Aerodynamics, 40 (1992) 55-70.
Howard, Selection of Bicycle Wheel Type, The UMAP Journal, 22.3 (2001).
Bloodhound SSC to make test debut this year . . . Sarah Gfiffiths, Jun. 15, 2015, Daily Mail.com.
Online Picture: Bloodhound SSC Diagram.
Online Picture: Bloodhound SSC Front View.
Online Picture: Bloodhound SSC Rear View.
Online Picture: Navistar Labeled Truck inside a Wind Tunnel-Lawerence Livermore Label.
Online Picture: Troytec Airblade Product: http://www.troytec.de/NEWS/AIR-BLADE_1-0,151,62,4,0,15.html.
Online Website: Windshear Wind Tunnel: www.windshearinc.com.
"Wind Tunnel and Fuel Consumption Tests of Truck-trailer with Side-skirt" by Kao-Shun Su, published by the 18th National Conference on Vehicle Engineering, Dec. 1-3, 2013, NPUST., Pingtung, Taiwan.
"Implementation Guidance for the Tractor-Trailer GHG Regulation" published by the California Air Resources Board, Oct. 2012.
NTEA Brochure announcing 2015 Green Truck Summit trade show.
NASA Website Announcement of Wind Tunnel Tests: http://www.nasa.gov/centers/ames/news/releases/2010/10-13AR.html.
Lawerence Livermore Website Announcement of Wind Tunnel Tests: https://www.Ilnl.gov/news/lawrence-livermore-national-lab-navistar-work-increase-semi-truck-fuel-efficiency-full-scale.
Online Website: Autoweek; "Honda reveals 2015 IndyCar aero kits"; Mar. 9, 2015; http://autoweek.com/article/indycar/honda-reveals-2015-indycar-aero-kits.

* cited by examiner

-Reference Art-

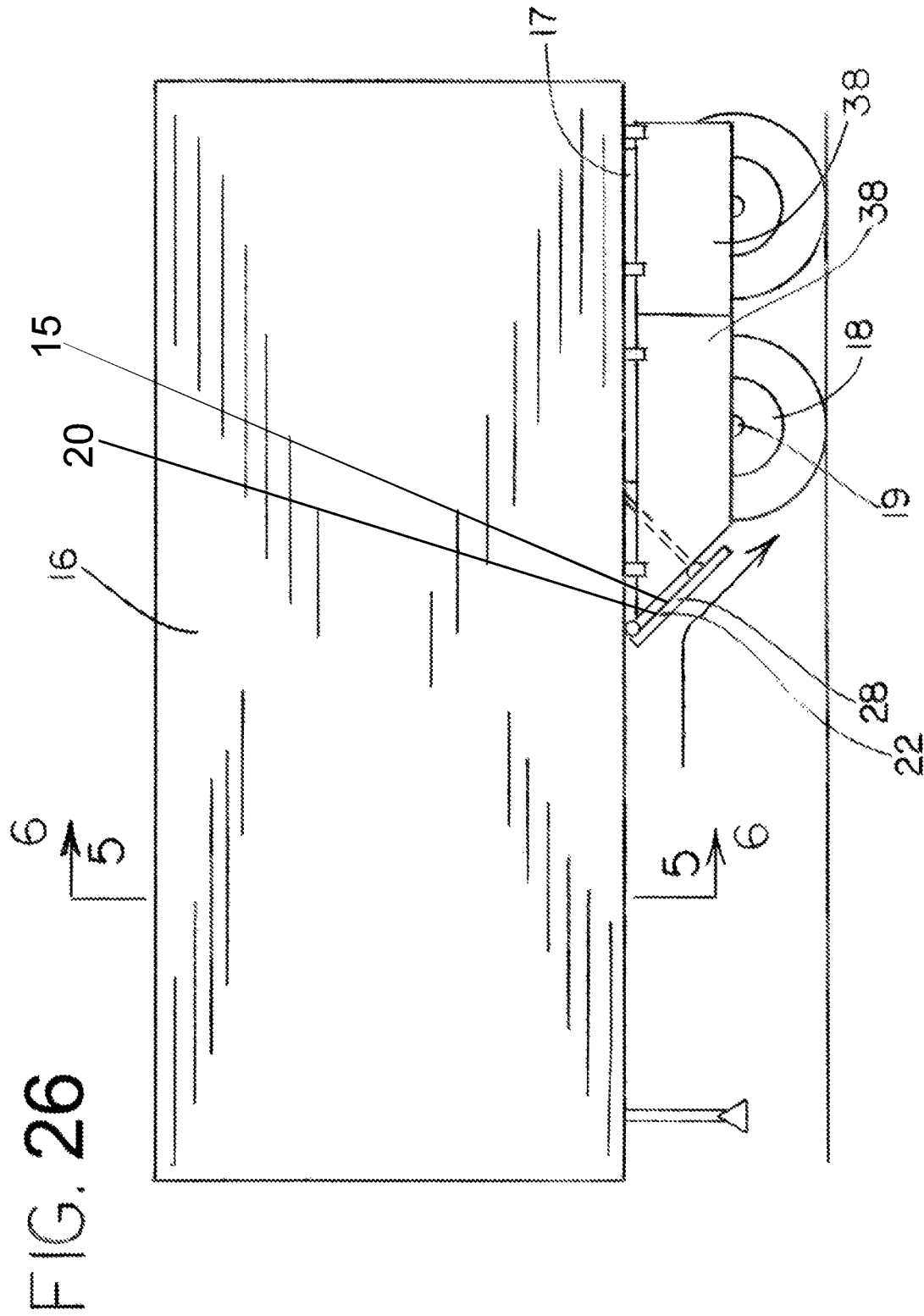

WHEEL FAIRING DEFLECTING WIND ONTO LOWER WHEEL

BACKGROUND

Field

The present embodiment relates to an apparatus for the reduction of aerodynamic drag on vehicles having wind-exposed wheels of a wheel assembly mounted underneath the vehicle body, such as on large commercial trucks.

Description of Prior Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 17.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

Vehicles having wind-exposed wheels are particularly sensitive to external headwinds reducing propulsive efficiency. Drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces.

Since upper wheel surfaces are moving against the wind at more than the vehicle speed, the upper wheel drag forces contribute more and more of the total vehicle drag as external headwinds rise. Thus, as external headwinds rise, a greater fraction of the net vehicle drag is shifted from vehicle frame surfaces to upper wheel surfaces.

Moreover, upper wheel drag forces must be overcome by a propulsive counterforce applied at the axle. Such propulsive counterforces suffer a mechanical disadvantage against the upper wheel drag forces, since each net force is applied about the same pivot point located at the bottom where the wheel is in stationary contact with the ground. This mechanical advantage that upper wheel drag forces have over propulsive counterforces further augments the effective vehicle drag that exposed upper wheels contribute under rising headwinds. As a result of these magnified effects of upper wheel drag on resisting vehicle propulsion, vehicle drag is more effectively reduced by reducing the aerodynamic pressure on the upper wheel surfaces while leaving the lower wheel surfaces exposed to impinging headwinds.

Furthermore, shielding the lower wheel surfaces can cause a net increase in vehicle drag, and a loss in propulsive efficiency. Not only does the propulsive counterforce applied at the axle have a mechanical advantage over the lower wheel drag forces, but shielding the lower wheel surfaces using a deflector attached to the vehicle body shifts the drag force from being applied at the lower wheel to an effective higher elevation at the axle, thereby negating any mechanical advantage of a propulsive counterforce applied at the axle has over the lower wheel drag force. As a result, aerodynamic trailer skirts in widespread use today are unnecessarily inefficient, since they generally extend below the level of the axle.

Nevertheless, extended height trailer skirts have been shown to improve propulsive efficiency, since they reduce the aerodynamic pressure on the upper wheel surfaces, which cause the vast majority of wheel drag and virtually all of the loss in vehicle propulsive efficiency due to wheel drag. However, the extended skirts shown in the art also impact the aerodynamic pressure on the lower wheel surfaces, where propulsive counterforces delivered at the axle have a mechanical advantage over lower wheel drag forces.

As mentioned, diverting wind from impinging the lower wheel surfaces actually increases overall vehicle drag, reducing propulsive efficiency. Deflecting wind from impinging these lower wheel surfaces transfers the aerodynamic pressure from these slower moving surfaces also suffering a mechanical disadvantage, to faster moving vehicle body surfaces having no mechanical advantage over propulsive counterforces, thereby increasing vehicle drag.

Nevertheless, numerous examples in the art demonstrate the current preference for aerodynamic skirts extending to below the level of the axle. For example, in U.S. Pat. No. 7,942,471 B2, US 2006/0152038 A1, U.S. Pat. No. 6,974,178 B2, U.S. Pat. No. 8,303,025 B2, U.S. Pat. No. 7,497,502 B2, U.S. Pat. No. 8,322,778 B1, U.S. Pat. No. 7,806,464 B2, US 2010/0066123 A1, U.S. Pat. No. 8,342,595 B2, U.S. Pat. No. 8,251,436 B2, U.S. Pat. No. 6,644,720 B2, U.S. Pat. No. 5,280,990, U.S. Pat. No. 5,921,617, U.S. Pat. No. 4,262,953, U.S. Pat. No. 7,806,464 B2, US 2006/0252361 A1, U.S. Pat. No. 4,640,541 all make no mention of the differing relationships between upper wheel drag forces and lower wheel drag forces affecting vehicle propulsive efficiency. Most of these patents depict figures showing skirts extending well below the level of the axle. And an examination of leading trailer skirt manufacturers shows the prevalence for extended height skirts currently for sale and needed to meet California carbon emission requirements.

Furthermore, a recent in-depth wind tunnel study sponsored the US Department of Energy and conducted at a pre-eminent research institution of the United States government, Lawerence Livermore Laboratory was published Mar. 19, 2013, "Aerodynamic drag reduction of class 8 heavy vehicles: a full-scale wind tunnel study", Ortega, et. al, and concluded that trailer skirts are one of the most effective means to reduce drag on large tractor-trailer trucks. A large number of trailer skirt configurations were tested in this study, which employed traditional techniques for measuring total drag on the vehicle. Due to the nonlinear effects of upper wheel drag in rising headwinds, such techniques can produce inaccurate measurements of gains in propulsive efficiency for vehicles having wheels exposed to headwinds. Thus, as yet this important relationship of upper wheel drag more predominately affecting overall vehicle drag and especially over lower wheel drag which is often comparatively negligible and suffers a mechanical disadvantage against propulsive counterforces applied at the axle—has gone unrecognized.

And in the patent art cited above, several patents such as U.S. Pat. No. 4,262,953, U.S. Pat. No. 4,640,541, US 2006/0252361 A1, U.S. Pat. No. 7,806,464 B2, U.S. Pat. No. 8,322,778 and others depict wind deflecting panels generally spanning the lateral width of the trailer, thereby inducing unnecessary drag by blocking air otherwise funneled between the wheels. Funneled air into the rear of the vehicle can reduce pressure drag on the vehicle. In the art, there are numerous other examples of devices attempting to enhance this vehicle drag reducing effect.

Finally, also in the cited art above, several patents such as US 2010/0066123 A1, U.S. Pat. No. 8,342,595 B2 and U.S. Pat. No. 8,251,436 B2 depict wind deflecting panels in front of the wheels of the trailer extending to well below the level of the axle, thereby inducing unnecessary vehicle drag by transferring drag from the slower moving lower wheel surfaces having a mechanical disadvantage, to the faster moving vehicle body and frame. In the art, there are numerous other examples of devices attempting to enhance this wheel drag reducing effect.

SUMMARY

All embodiments comprise either wind-deflecting skirts or panels for use on vehicles having wind-exposed wheels on a wheel assembly mounted underneath the vehicle body, such as on the trailers of large commercial trucks. Each embodiment is designed to deflect vehicle headwinds from directly impinging on the upper wheel surfaces—the predominate drag inducing surfaces on a wheel—and onto the lower wheel surfaces the least effective drag inducing surfaces on a wheel—thereby reducing vehicle drag and increasing vehicle propulsive efficiency. Each embodiment is also ideally designed to keep the lower wheel surfaces exposed to headwinds. Since propulsive counterforces applied at the axle have a natural mechanical advantage over lower wheel drag forces, deflecting headwinds onto fully exposed lower wheels surfaces also increases vehicle propulsive efficiency.

An embodiment comprises an inclined aerodynamic deflector panel assembly designed to deflect headwinds otherwise impinging on upper wheel surfaces downward onto lower wheel surfaces of a trailing wheel set on either side of the wheel assembly. The deflector panel assembly can be a generally flat panel tilted to deflect air downward onto the lower wheel surfaces, or a panel with perpendicular end plates projection forward forming a U-shaped channel arranged to funnel air downward onto the lower wheel surfaces. The deflector panel assembly extends down from the vehicle body ideally to no lower than the level of the axle of the wheel assembly, and may included wheel skirts covering the trailing wheel sets. The panel may also be extended across the lateral width of the trailer to deflect headwinds below the trailing central axle assembly.

An embodiment comprises an aerodynamic skirt panel assembly designed to deflect headwinds otherwise impinging on upper wheel surfaces downward onto lower wheel surfaces of a trailing wheel set on either side of the wheel assembly. Toward the front end, the skirt panel assembly is located substantially inboard toward the centerline of the vehicle. Toward the rear end, the skirt panel assembly diverges rapidly to the outside of the trailing wheel set in order to divert headwinds in part onto the lower wheel surfaces. The ideal skirt assembly extends down from the vehicle body to no lower than the level of the axle in front of the wheel assembly, and may include wheel skirts covering the trailing wheel sets.

An embodiment comprises a method for reducing the total drag-induced resistive forces upon the wheel assembly as directed against the vehicle to reduce the required effective vehicle propulsive counterforce.

DESCRIPTION OF THE DRAWINGS

While one or more aspects pertain to most wheeled vehicles not otherwise having fully shielded wheels that are completely protected from oncoming headwinds, the embodiments can be best understood by referring to the following figures.

DESCRIPTION OF WHEEL DRAG MECHANICS

As mentioned, drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces. Thus, vehicles having wind-exposed wheels are particularly sensitive to external headwinds reducing propulsive efficiency. As a result, there exists a need for an improved aerodynamic deflector and skirt for use on industrial trucks and trailers.

Because of this rising dominance of wheel drag in rising headwinds—due to the non-linear relation from rising wind speeds between net drag forces on vehicle frame surfaces versus net drag forces on vehicle wheel surfaces—a discussion of the wheel drag mechanics central to this non-linear relationship is presented herein. The upper wheel fairing is described below as a simple solution for reducing vehicle drag in rising headwinds on a cycle, and is presented herein as background for the present embodiment.

Figure 11:
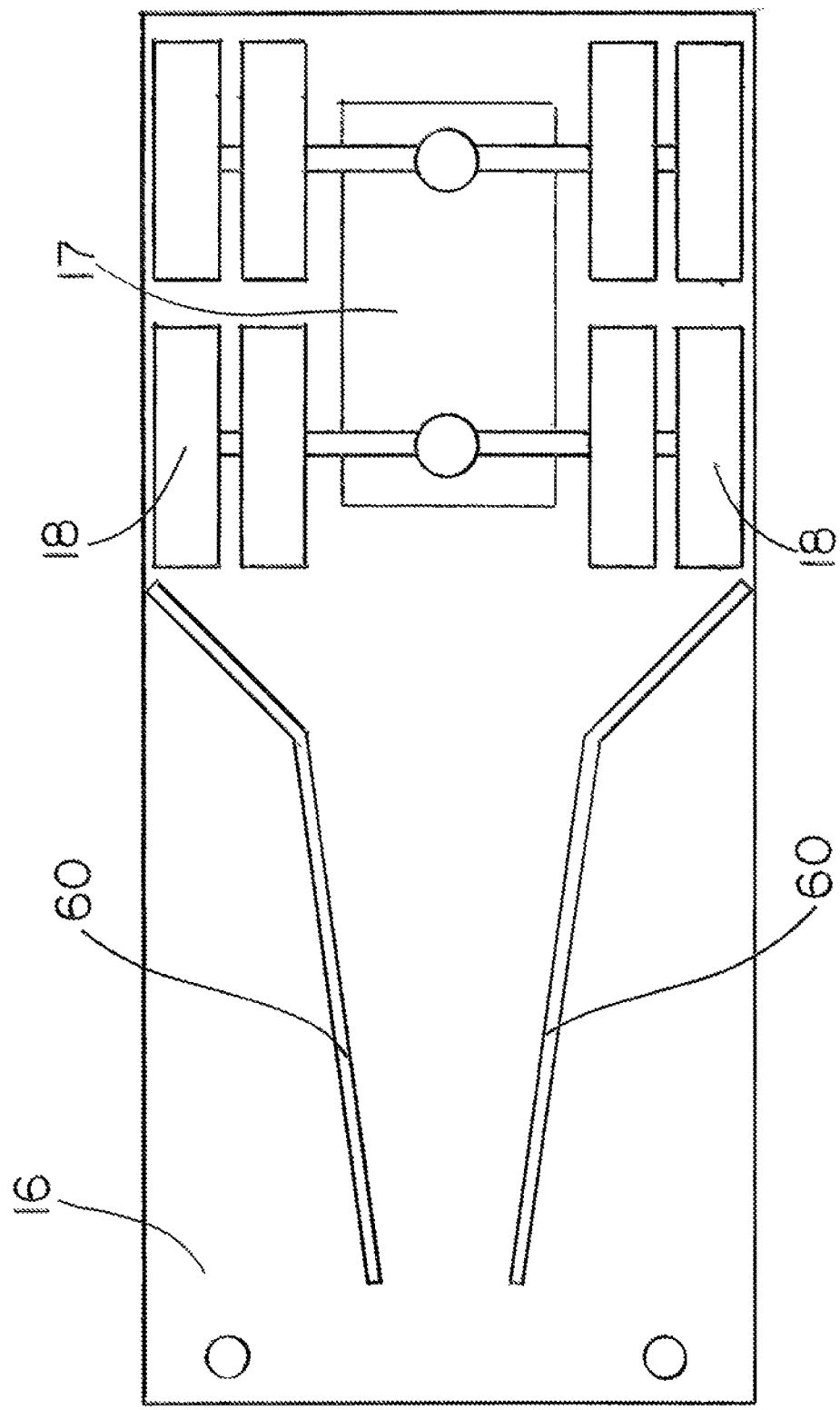
In FIG. 11, the aerodynamic deflector skirt assembly of FIG. 10 is shown from below the vehicle.
Figure 12:
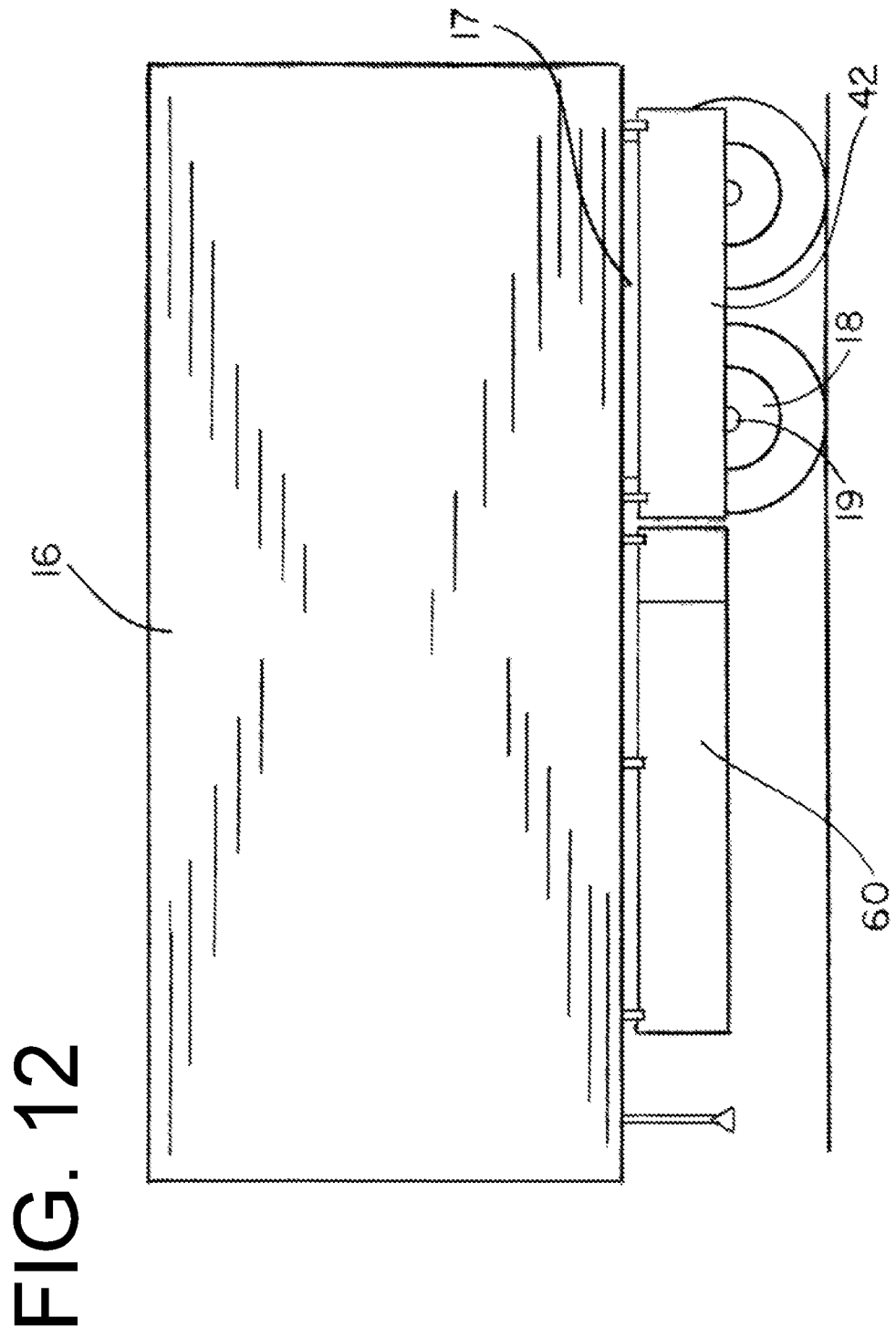
In FIG. 12, the aerodynamic deflector skirt assembly together with a wheel skirt panel assembly is mounted to the trailer of an industrial truck.

The shielding provided by fairing 1 in FIG. 11 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

Figure 14:
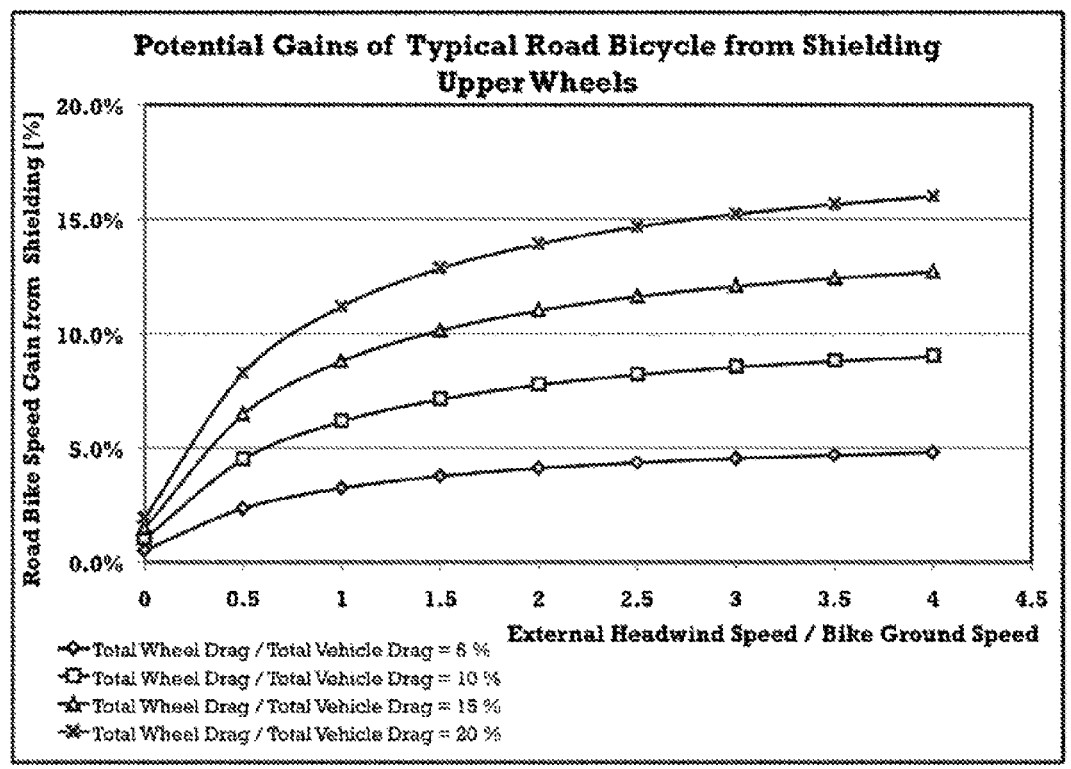
FIG. 14 is a series of curves showing the results of an analysis of the drag mechanics on a bicycle with shielded upper wheels, indicating that a bicycle with shielded upper wheels is faster when facing headwinds. Several curves are displayed, as examples of different bicycles each having a different proportion of wheel-drag to total-vehicle-drag.

FIG. 14 shows the results of an analysis of the drag mechanics on a bicycle with shielded upper wheels. The curves indicate that a bicycle with shielded upper wheels is faster when facing headwinds. Moreover, the gains in propulsive efficiency are shown to quickly increase in only a modest headwind, but continue to rise as headwinds increase further.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 17:
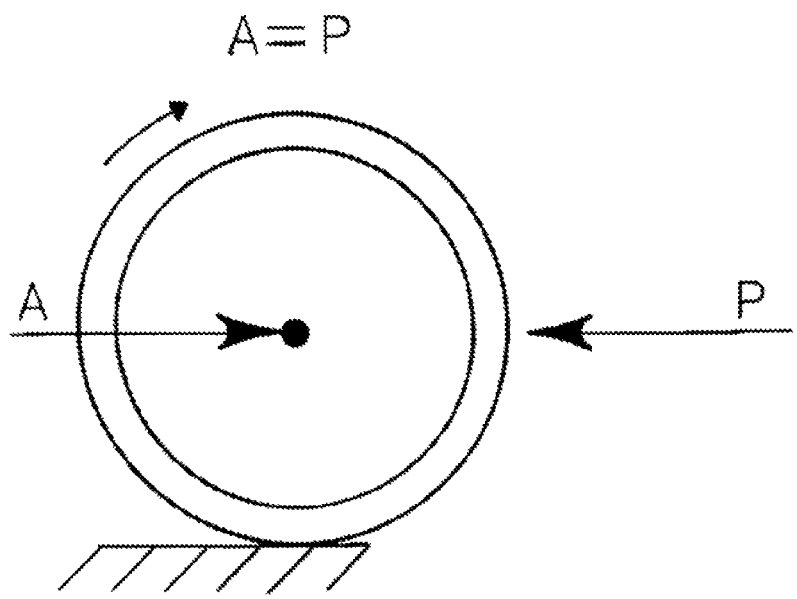
FIG. 17 (Prior Art) is a diagram of a wheel rolling on the ground representing typical prior art models, showing the net pressure drag force (P) exerted upon the forward wheel vertical profile—which moves at the speed of the vehicle—being generally centered near the axle of the wheel and balanced against the propulsive force (A) applied at the axle.
Figure 18:
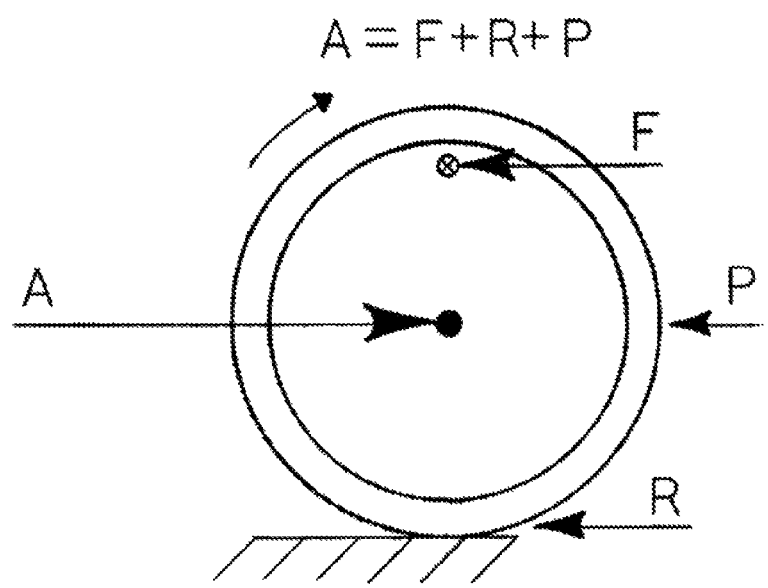
FIG. 18 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.
Figure 19:
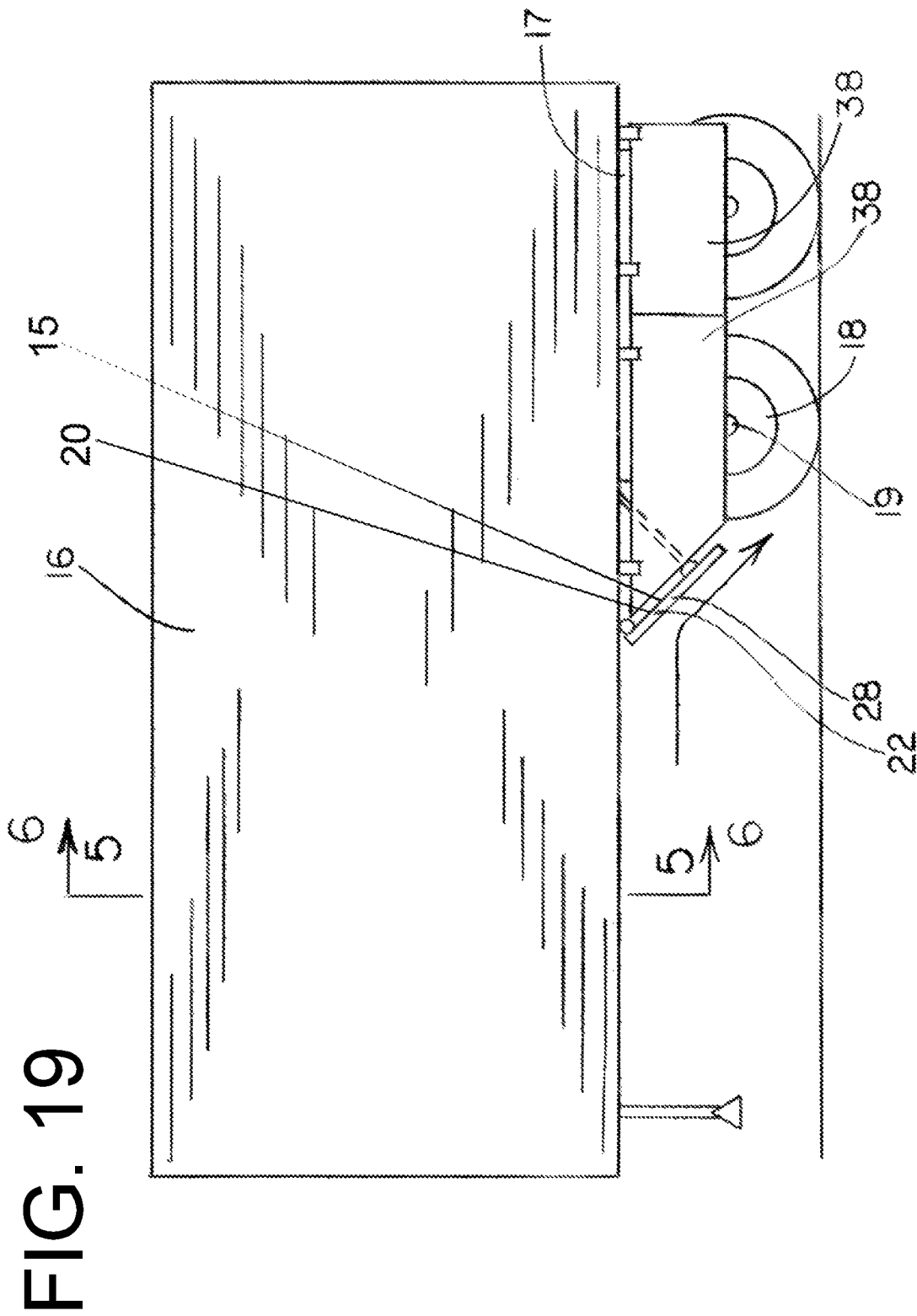
Figure 24:
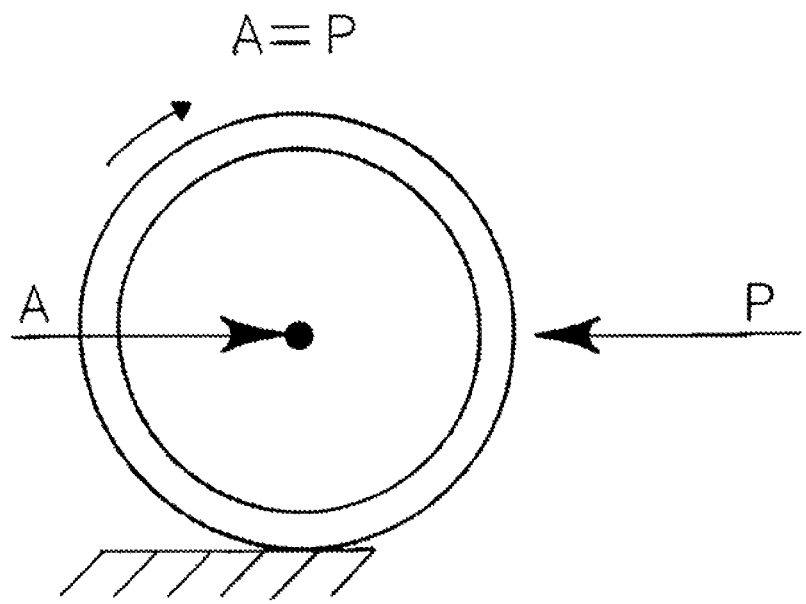
Figure 25:
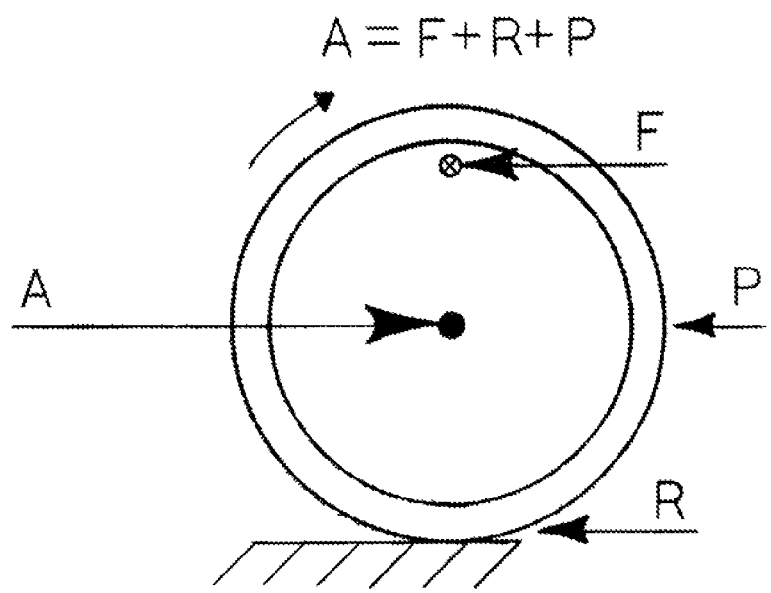

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 17), the net frictional drag force (F) upon the moving surfaces is generally offset to near the top of the wheel (as shown in FIG. 18).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 17 and FIG. 18) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 18), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 18) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 18) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging the slower moving lower surfaces of a rolling wheel generally oppose wheel motion with much less retarding torque than drag forces from winds impinging the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind. This simple test offers an explanation for the unexpected result and demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 15:
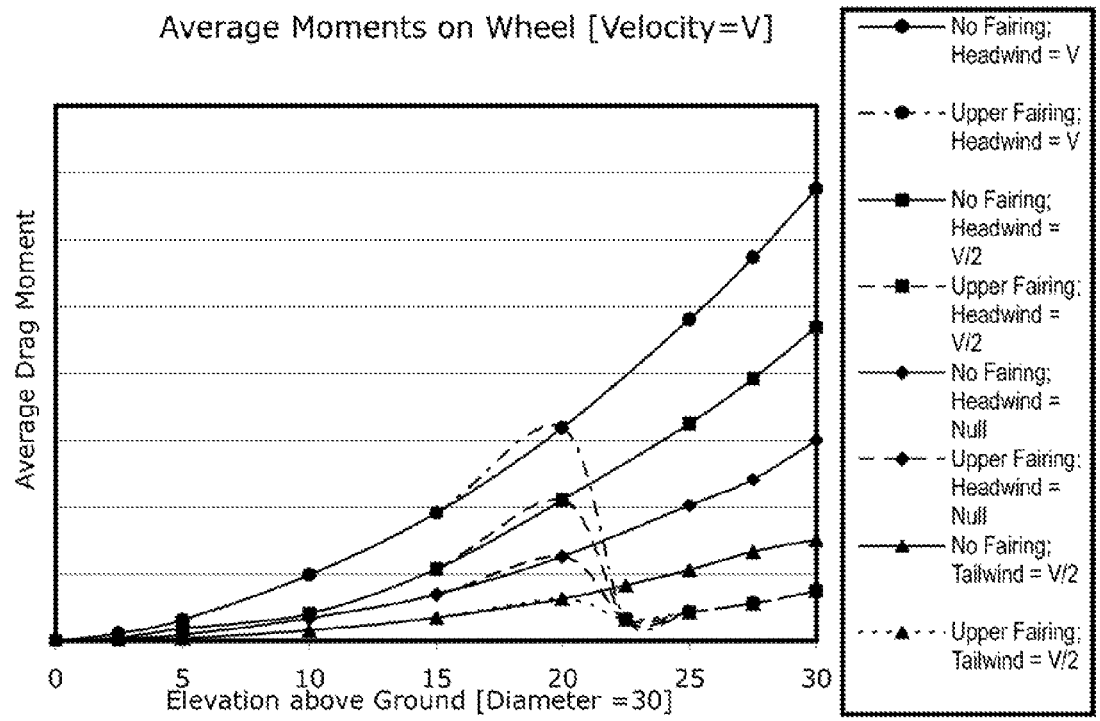
FIG. 15 shows a plot of calculated average moments—about the ground contact point—of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The rising solid curves plotted show the highest moments to be near the top of the wheel, while the dashed curves show the effect of the upper shield in substantially reducing the average drag moments on the rotating wheel.
Figure 16:
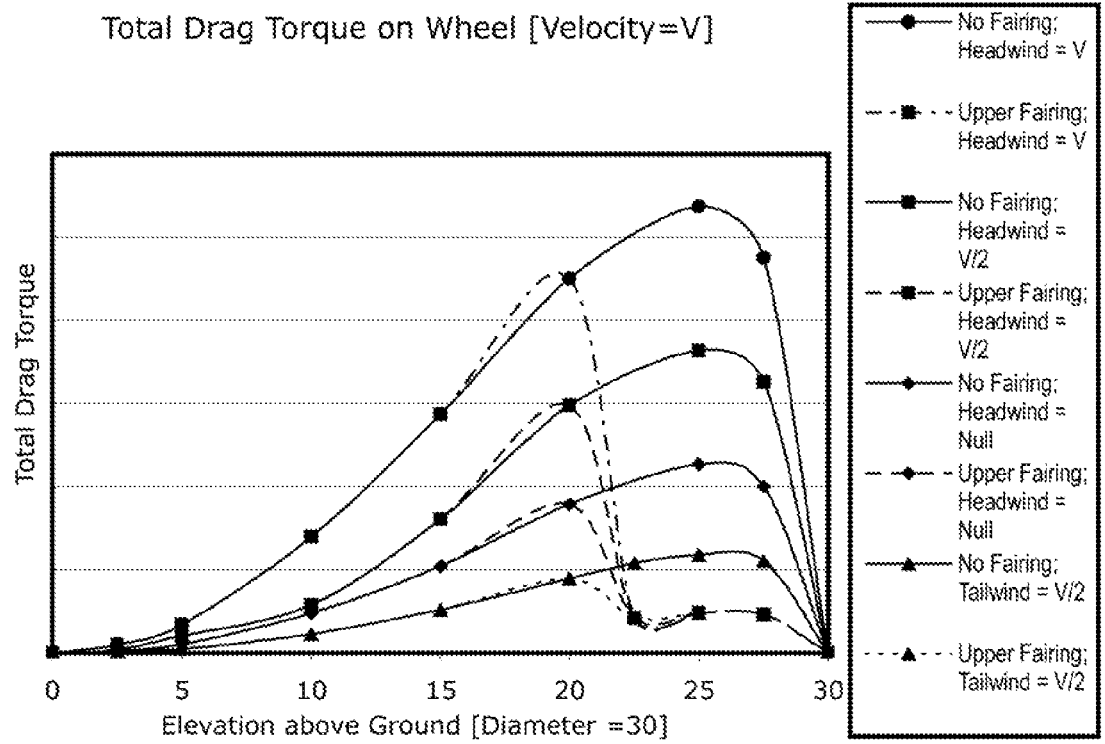
FIG. 16 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 15), and then summing these moments at various wheel elevations above the ground and plotting the results (FIG. 16). The area under the resulting curve (shown in FIG. 16 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 16). These calculations are simply determined from the geometry of the rotating wheel; the object of this analysis is to determine the likely relative magnitudes of drag torques upon the wheel at various elevations.

From the resulting plots (FIG. 16), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 16 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 16. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 15 and 16, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Figure 13:
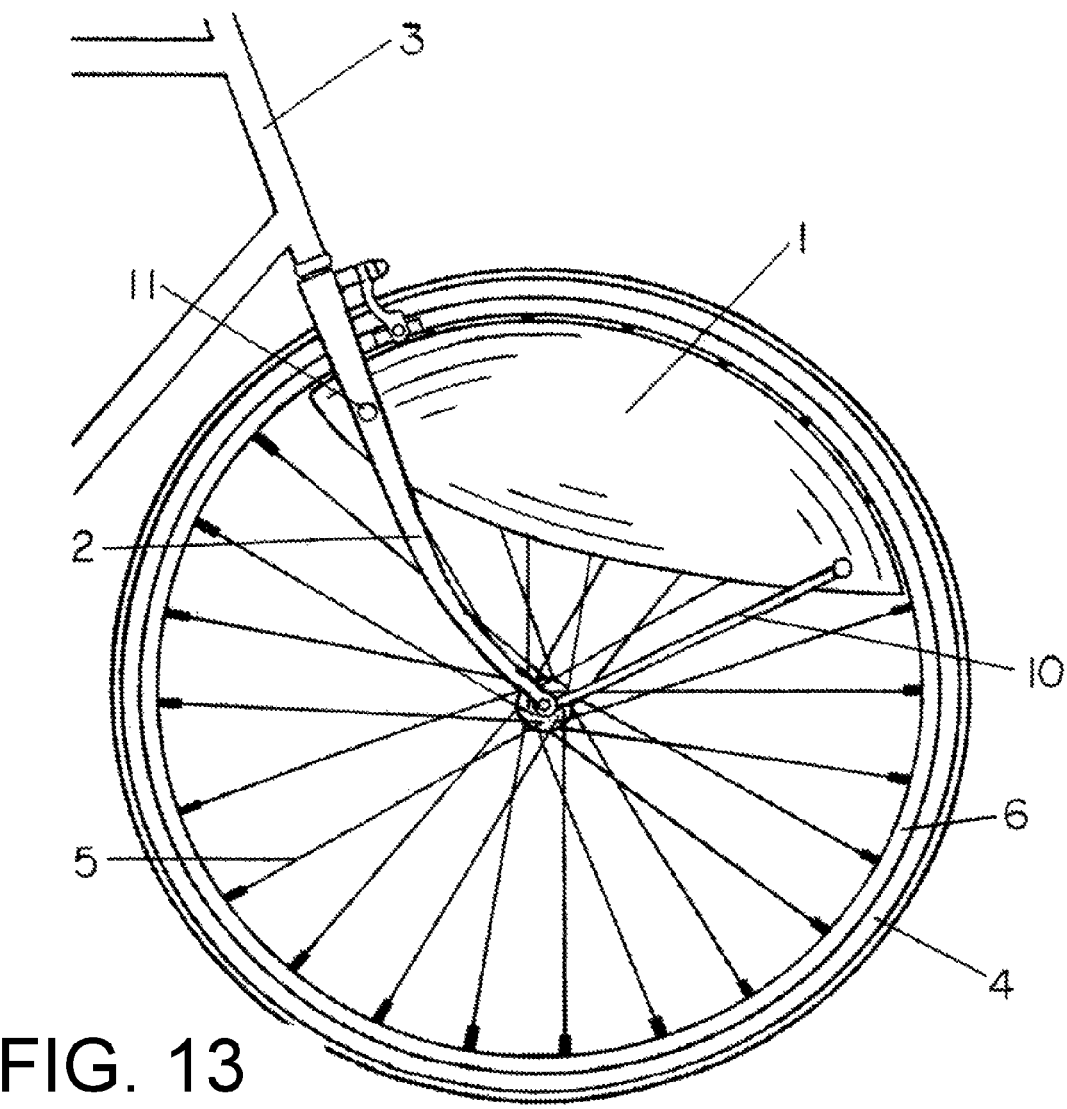
FIG. 13 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.

Hence, the fairing shown in FIG. 13 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

DETAILED DESCRIPTION

Various embodiments are described below in detail, each providing means to deflect headwinds from directly impinging on the upper wheel surfaces and onto the lower wheel surfaces of a trailing wheel assembly, thereby reducing vehicle drag and increasing propulsive efficiency.

First Embodiment

Figure 1:
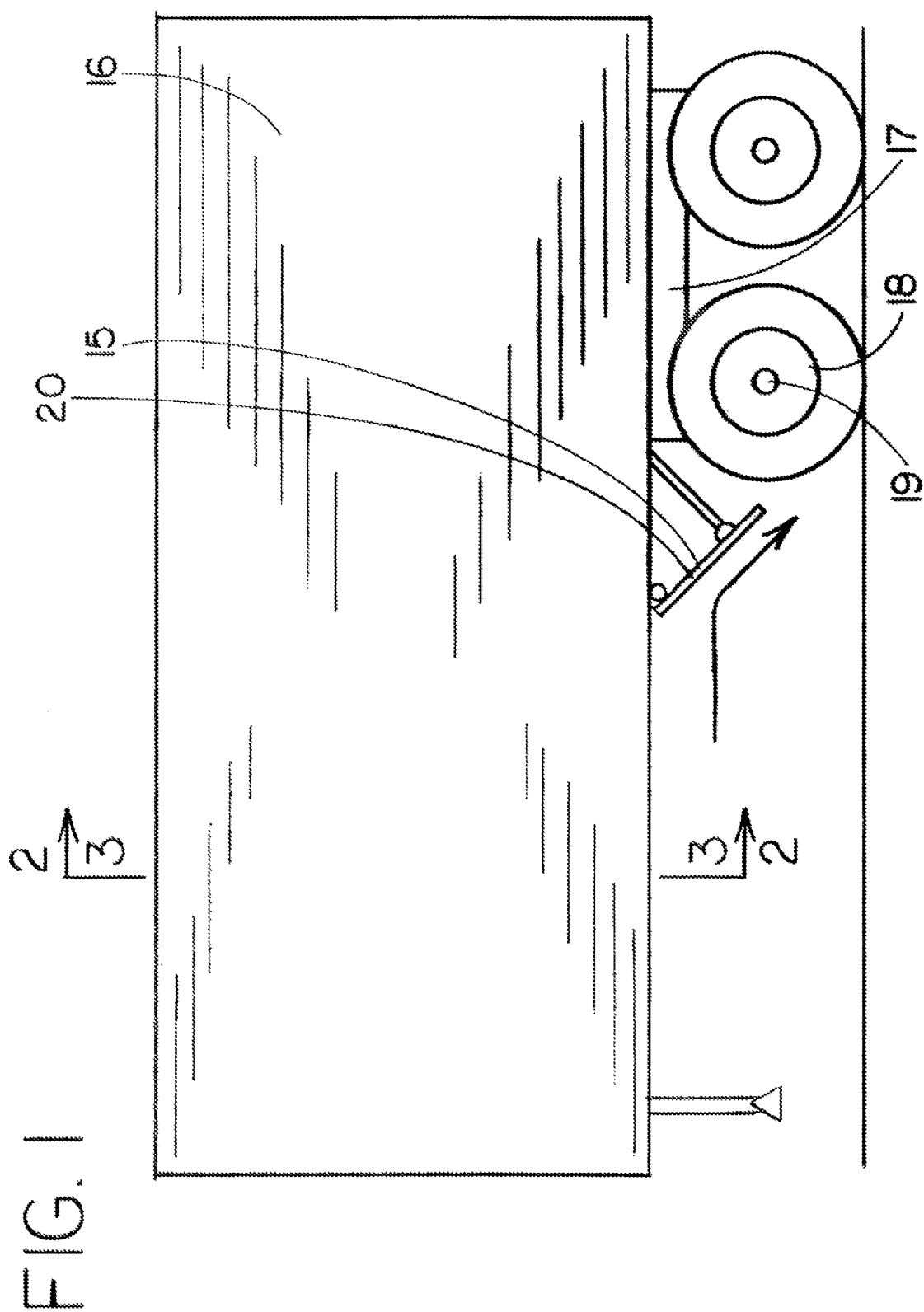
In FIG. 1, an inclined aerodynamic deflector panel assembly is mounted underneath the trailer of an industrial truck in front of a wheel set of the rear wheel assembly and rearward of the forward landing gear.
Figure 2:
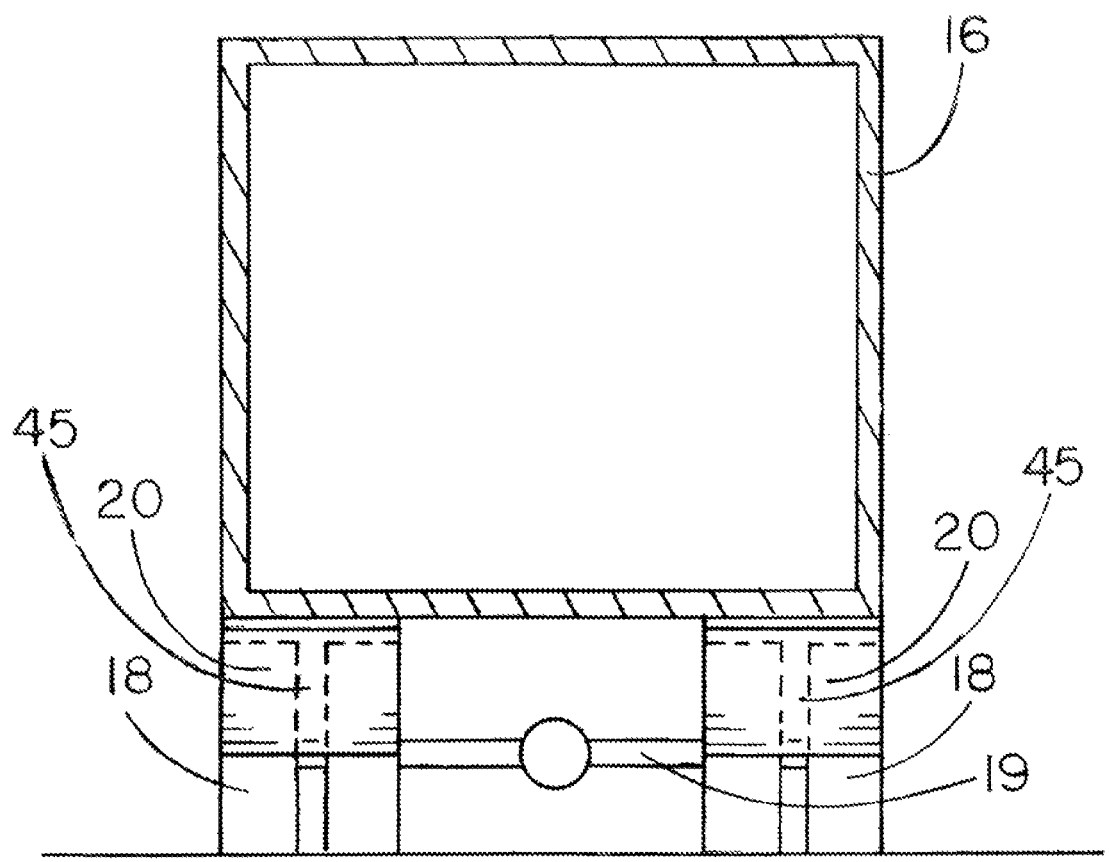
In FIG. 2, the inclined aerodynamic wheel deflector panel assembly of FIG. 1 is shown mounted on the trailer as viewed in cross-section from the front of the vehicle. Two deflector panel assemblies are shown, each as mounted in front of one of the wheel sets of the rear wheel assembly.

FIGS. 1 and 2

As shown in FIGS. 1 and 2, an embodiment comprises an inclined aerodynamic wheel deflector panel assembly 20 attached to and mounted underneath the body of a trailer 16 for a commercial vehicle. The inclined wheel deflector panel assembly 20 is located forward of the rear wheel assembly 17 and located directly in front of a trailing wheel set 18 which would otherwise be exposed to headwinds when the vehicle is in forward motion. The inclined wheel deflector panel assembly 20 is planar in shape, mounted inclined in a forwardly-angled orientation with the upper edge more forwardly located and the lower surface located more rearward on the vehicle. The inclined wheel deflector panel assembly 20 spans the lateral width of the trailing wheel set 18 of the trailing rear wheel assembly 17 located on either side of the vehicle. The inclined wheel deflector panel assembly 20 extends downward ideally to no lower than the level of the axle 19 and is located proximal to the trailing wheel set 18 in order to deflect upper wheel headwinds onto the exposed lower wheel surfaces.

It can be concluded from the discussion of wheel drag mechanics above, that since propulsive counterforces applied to the wheel at the axle have a mechanical advantage over lower wheel drag forces—which are necessarily applied to the wheel below the level of the axle—directing upper wheel headwinds onto the lower wheel surfaces can significantly reduce overall vehicle drag and improve propulsive efficiency. The reasons for these gains in vehicle efficiency become apparent by further considering how wheel drag forces compare with vehicle body drag forces.

As discussed earlier, drag forces on the wheel must be countered by a propulsive force from the vehicle body applied at the axle. And it can be established that drag forces on the upper wheel have a mechanical advantage over countervailing propulsive counterforces applied at the axle. And with the wheel deflector assembly attached to the vehicle body, drag on the deflector must also be countervailed by a propulsive counterforce applied to the vehicle body at a propulsive axle.

Thus, in order to determine the relative difference in total vehicle drag between the traditional extended height deflector diverting headwinds from impinging on both the upper and the lower wheels, and the improved reduced height deflector with lower wheel surfaces ideally fully exposed to headwinds, the added vehicle drag derived from the surface of the deflector panel extending below the level of the axle must be compared against the vehicle drag arising from the corresponding additional surfaces of the lower wheel otherwise shielded by the extended deflector. And as already established above, the relative effects of these resistive forces on vehicle propulsion are non-linearly related, and vary considerably with increasing headwinds: for vehicles facing faster external headwinds the nonlinear effects quickly increase, as discussed above and as shown in FIG. 14, where the results of an analysis of the drag mechanics of a bicycle facing increasing headwinds shows rapid increases in propulsive efficiency by shielding the upper wheels.

A skilled artisan will recognize from the curves shown FIG. 14 that as the relative external headwind increases on the vehicle, so does the increase in propulsive efficiency of the vehicle. And a skilled artisan will also recognize that the natural design constraint described above for the cycle wheel fairing of FIG. 13 similarly applies to the wind deflecting fairing of the present embodiment.

This inherent design constraint implies that for a given vehicle under a given relative external headwind condition—as shown along the horizontal axis of the plots in FIG. 14—a wind-deflecting fairing of the present embodiment will similarly be constrained to have a limited overall wind-deflecting extent that will produce a reduction in overall vehicle drag. This limited wind-deflecting extent includes a limit on the total drag-inducing surface area extent of the wind-deflecting fairing, including a combined limit in both forward and downward extension of fairing surfaces.

And as discussed extensively above for the cycle wheel fairing of FIG. 13, the relative effects of drag forces on the fairing versus drag on the various points on the wheel are not simply related. Instead, the drag forces on various points on the wheel are magnified or de-magnified as applied against the axle, whereas the drag on either the cycle fairing or on the similar drag-inducing surfaces of the wind-deflecting fairing of the present embodiment are directly applied equivalently against the same axle.

Thus, since propulsive counterforces applied at the axle have a mechanical advantage over drag forces on the lower wheel surfaces, a simple comparison of the net drag force on either surface alone—either on the lower wheel or on the extended deflector surface—is entirely insufficient to determine the relative effect each has on vehicle propulsive efficiency. Instead, the magnitudes of the drag force from each surface must be reflected to an equivalent force applied at the same axle and compared against one another.

For the lower wheel surfaces, the net drag force as applied against the axle is diminished by leveraging about the point of ground contact, as previously discussed. For the lower deflector panel surface, the drag force is directed against the axle without magnification since it is transmitted directly through the body and frame of the vehicle. Although another axle of the vehicle may be the used as the propulsive axle, the two net drag forces must be compared against each other as reflected at the same affected axle in order to gauge their relative effects on overall vehicle drag.

For the lower deflector surface, the drag force on the surface is—like other vehicle body drag forces—directly countervailed by the propulsive counterforce applied at the driven axle. For the lower wheel surfaces, the situation is more complicated due both to the mechanical advantage that the propulsive forces have over lower wheel drag forces, and to the effects that the summation moments of drag force (FIG. 15) at different points on the rotating wheel have on the net lower wheel drag force.

As noted earlier under the Description of Wheel Drag Mechanics, and as shown in the plot of FIG. 16, the average drag torque exerted against the lower wheel surfaces has far less impact on the total wheel drag as exerted upon the vehicle than does the average drag torque exerted against the upper wheel surfaces. This is due largely to the pivoting geometry of the rotating wheel, where wheel forces are levered about the same stationary point of ground contact at the bottom of the wheel. Owing in part to their longer moment arms, drag forces applied to the upper wheel produce far greater resistive torques on the wheel than do drag forces applied to the lower wheel.

Consequently, drag forces on the upper wheel surfaces are ideally shifted to the lower wheel surfaces in order to benefit the propulsive efficiency of the vehicle. As a result, deflecting headwinds from the upper wheel surfaces onto the lower wheel surfaces can substantially reduce overall vehicle drag and improve propulsive efficiency.

And in the case of industrial trucks having large wheels with larger tires, the relative effects of resistive pressure drag forces on the wheel over frictional drag forces is exacerbated over that of a spoked bicycle wheel as described above in the discussion of the wheel drag mechanics. As mentioned, the spoked wheels with thin tires and rims used on a bicycle can produce significant frictional drag effects resisting vehicle propulsion. Trucks with smooth wheels and tires are more significantly affected by pressure drag forces acting against the upper wheel forward-facing profile surfaces, than are bicycles with thin tires and rims.

Thus for trucks, deflecting upper wheel headwinds downward onto the lower wheel becomes an important operating function. Since propulsive counterforces at the axle have a mechanical advantage over lower wheel drag forces applied to the wheel below the level of the axle, deflecting headwinds downward onto the lower wheel can reduce overall vehicle drag and improve propulsive efficiency.

The natural design constraint method discussed above can also be used in combination with an accounting for the non-linear effects on vehicle drag from drag forces directed on various points on the wheel to determine the limited extent of the wind-deflecting fairing of the present embodiment that will also yield an overall reduction in vehicle drag, including the combined limit in both forward and downward extent of the fairing. And as is evident from the curves of FIG. 14, the combined limit for the overall drag-inducing extent of the wind-deflecting fairing of the present embodiment will vary with both vehicle configuration and relative external headwind condition.

From an examination of the curves of FIG. 14, it becomes evident that the worst-case limit for the overall extent of the fairing is while the vehicle is operated under null wind conditions, where the relative gains in vehicle efficiency are comparatively minimal, and as shown at the left vertical axis of the plots of FIG. 14. As the relative external headwind increases, the relative gains in vehicle efficiency quickly increase, as shown in the general trend of the efficiency curves rising toward the right side of the plots.

Therefore, a skilled artisan then will understand that the most restrictive limit for the overall extent of the fairing will be while the vehicle is operated under null external headwinds conditions. If the extent of the fairing is sufficiently limited to produce an overall reduction in vehicle drag under null operating conditions, then the thus limited fairing will also produce even more gains in vehicle efficiency under an external headwind condition.

And from the discussion above, it becomes evident that the fairing could be designed either to be more limited in forward extent and more extensive in downward extent or alternatively could be designed instead to be more extensive in forward extent and more limited in downward extent, and still produce the same measure of gains in overall vehicle propulsive efficiency.

Thus, the fairing could be designed to be somewhat limited in forward extent and to extend somewhat below the level of the axle while still yielding a reduction in overall vehicle drag, especially while the vehicle is operated under a substantial relative external headwind condition. This potential configuration for the fairing becomes quite evident both from an examination of the curves of FIG. 16, and from a consideration of how the very limited mechanical disadvantage that surfaces of the wheel located not very far below the level of the axle have over vehicle frame drag forces, such as wheel fairing or deflector drag forces.

Indeed, FIG. 16 shows that near the level of the axle, much less relative gains in propulsive efficiency are gained from shielding more centrally located wheel surfaces in elevation than from shielding the uppermost wheel surfaces positioned substantially above the axle near the critical elevation. And FIG. 16 also shows that the relative gains in vehicle efficiency increase in rising relative external headwinds.

While the ideal configuration of the fairing includes a limit for fairing surfaces to extend downward to lower than the level of the axle, the discussion above makes clear that this optimal limitation is not fully restrictive. Instead, a skilled artisan would recognize that a wind-deflecting fairing of the present embodiment could be designed to be somewhat limited in forward extent while also extending somewhat below the level of the axle while still yielding a reduction in overall vehicle drag, especially while the vehicle is operated under a variety of relative external headwind conditions.

Or alternatively, a wind-deflecting fairing of the present embodiment could be designed to be more extensive in forward extent, while being somewhat limited in extending to no lower than the level of the axle, while still yielding a reduction in overall vehicle drag, especially while the vehicle is operating under a variety of relative external headwind conditions. Thus, a variety of configurations for extending the surfaces of the wind-deflecting fairing of the present embodiment is included that will yield an effective reduction in overall vehicle drag.

In consideration of further embodiments described below, the operating principles described above will generally apply, and may be referred thereto.

Second Embodiment

Figure 3:
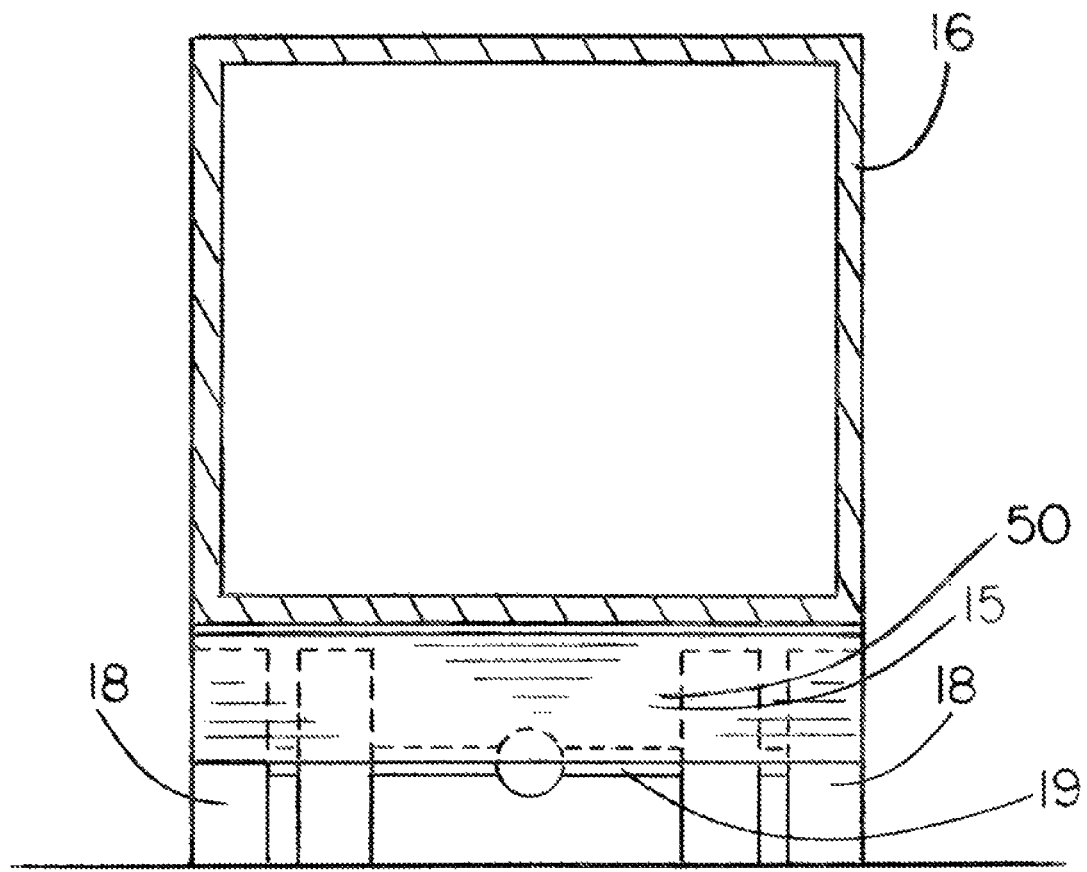
In FIG. 3, an inclined aerodynamic deflector panel assembly, which appears in side view similar to as shown in FIG. 1, is shown mounted on the trailer as viewed in cross-section from the front of the vehicle.

FIGS. 1 and 3

As shown in FIGS. 1 and 3, an embodiment comprises an inclined aerodynamic deflector panel assembly 15 attached to and mounted underneath the body of a trailer 16 for a commercial vehicle. The inclined deflector panel assembly 15 is located forward of the rear wheel assembly 17 and located in front of trailing wheel sets 18 which would otherwise be exposed to headwinds when the vehicle is in forward motion. The inclined deflector panel assembly 15 is planar in shape, mounted inclined in a forwardly-angled orientation with the upper edge more forwardly located and the lower surface located more rearward on the vehicle. The inclined deflector panel assembly 15 spans the lateral width of the trailer 17, and where aligned directly in front of the wheel sets 18 ideally extends downward to no lower than the level of the axle. The inclined deflector panel assembly 15 is located proximal to the trailing wheel assembly 18 in order to deflect headwinds onto the exposed lower wheel surfaces, and to deflect headwinds from directly impinging on the central axle assembly 19, thereby reducing overall vehicle drag and improving propulsive efficiency.

Third Embodiment

Figure 4:
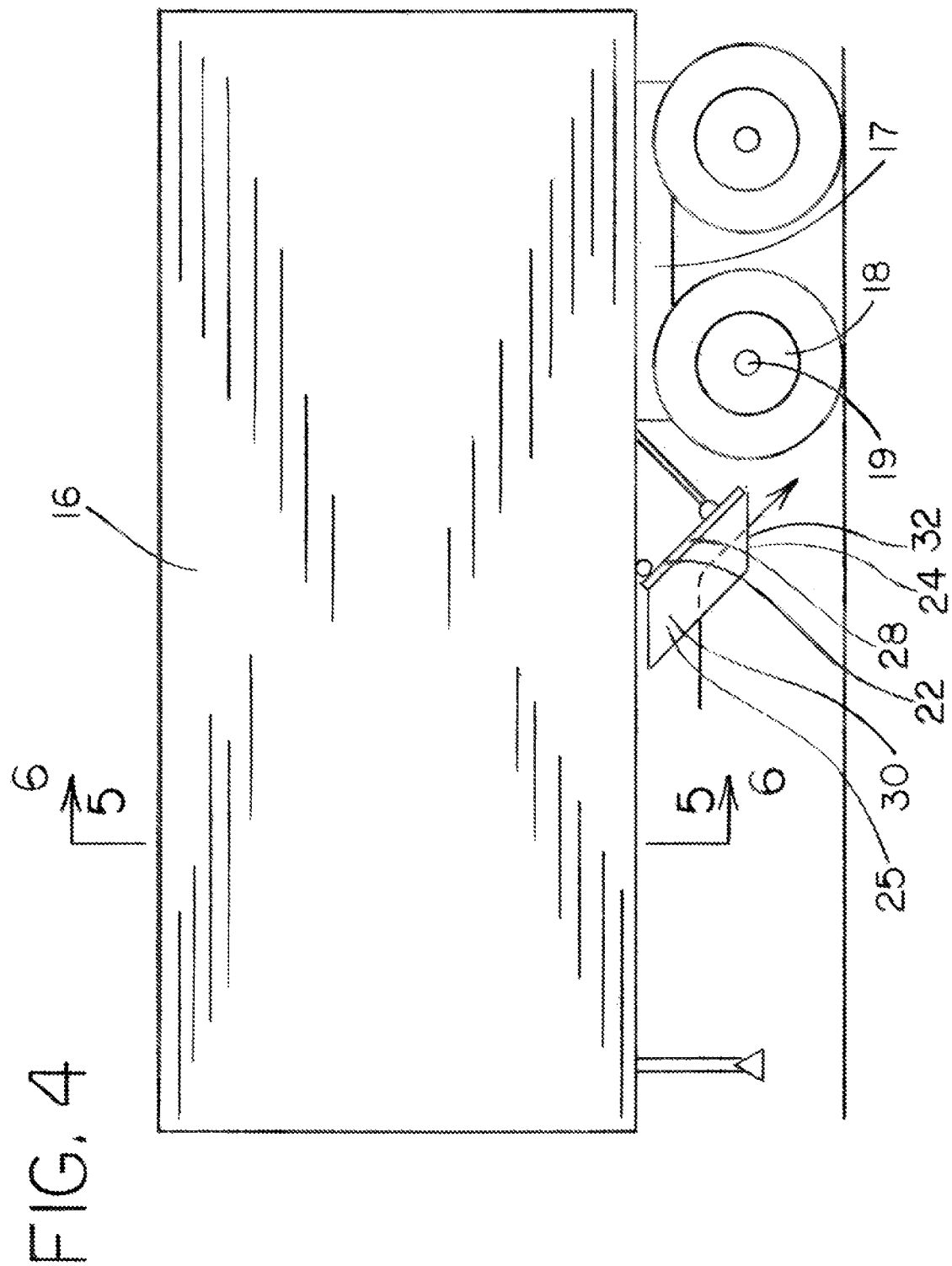
In FIG. 4, a channeled aerodynamic deflector panel assembly is mounted underneath the trailer of an industrial truck in front of the rear wheel assembly.
Figure 5:
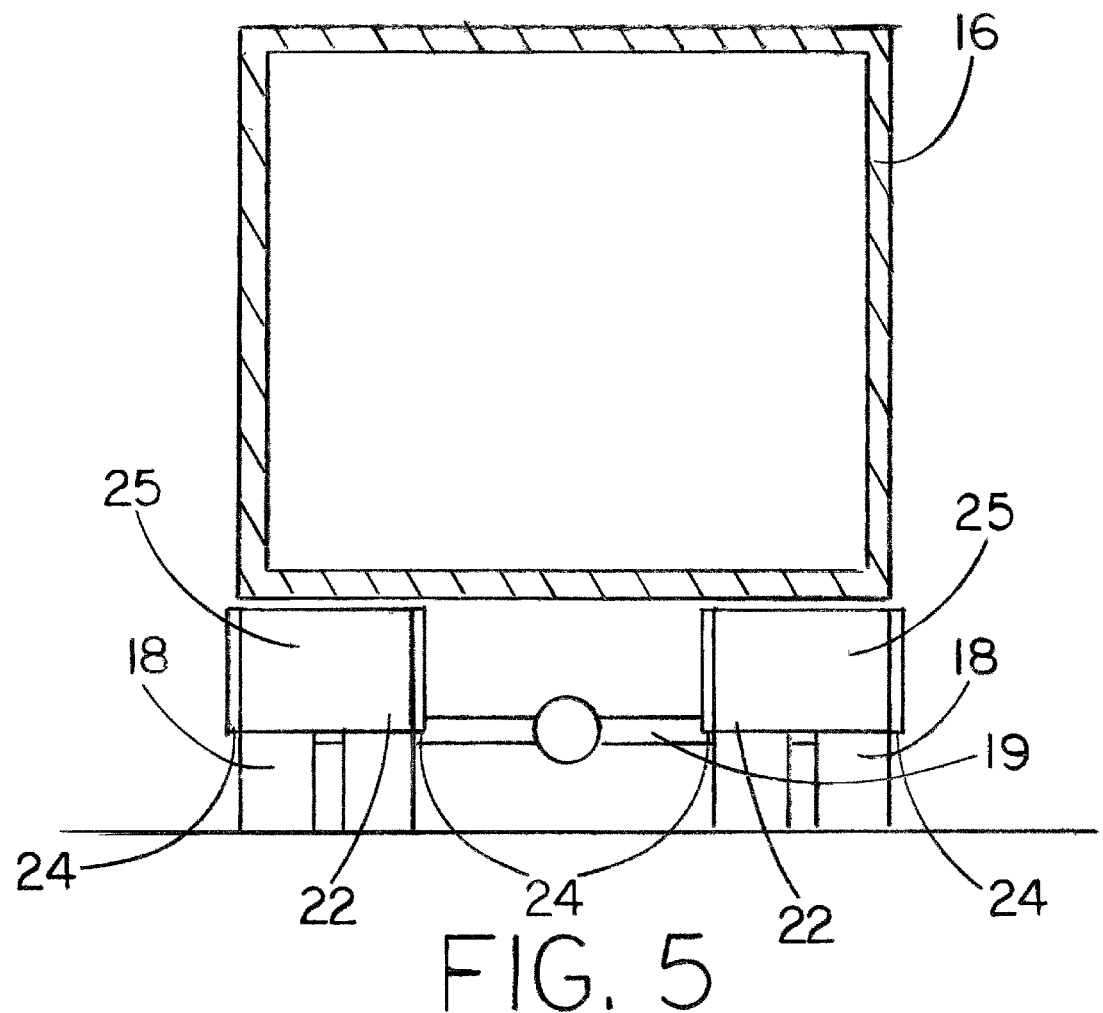
In FIG. 5, the channeled aerodynamic wheel deflector panel assembly of FIG. 4 is shown mounted on the trailer as viewed in cross-section from the front of the vehicle. Two deflector panel assemblies are shown, each as mounted in front of one of the wheel sets of the rear wheel assembly.

FIGS. 4 and 5

As shown in FIGS. 4 and 5, an embodiment comprises a channeled aerodynamic wheel deflector panel assembly 25 attached to and mounted underneath the body of a trailer 16 for a commercial vehicle. The channeled wheel deflector panel assembly 25 is located forward of the rear wheel assembly 17 and located directly in front of a trailing wheel set 18 which would otherwise be exposed to headwinds when the vehicle is in forward motion. The channeled wheel deflector panel assembly 25 includes a deflector plate 22 which is generally planar in shape, mounted inclined in a forwardly-angled orientation with the upper edge more forwardly-located and the lower surface located more rearward on the vehicle. The channeled wheel deflector panel assembly 25 includes forwardly-projecting end plates 24 attached to either side edge of the deflector plate 22, forming a channeled deflector panel assembly 25 to funnel headwinds directly onto the lower wheel surfaces, minimizing any outwardly deflected headwind from otherwise impinging on the trailing upper wheel surfaces.

The channeled wheel deflector panel assembly 25 ideally extends downward to no lower than the level of the axle 19 and is located proximal to the trailing wheel set 18 in order to deflect and funnel headwinds onto the exposed lower wheel surfaces, thereby reducing overall vehicle drag and improving propulsive efficiency.

Fourth Embodiment

Figure 6:
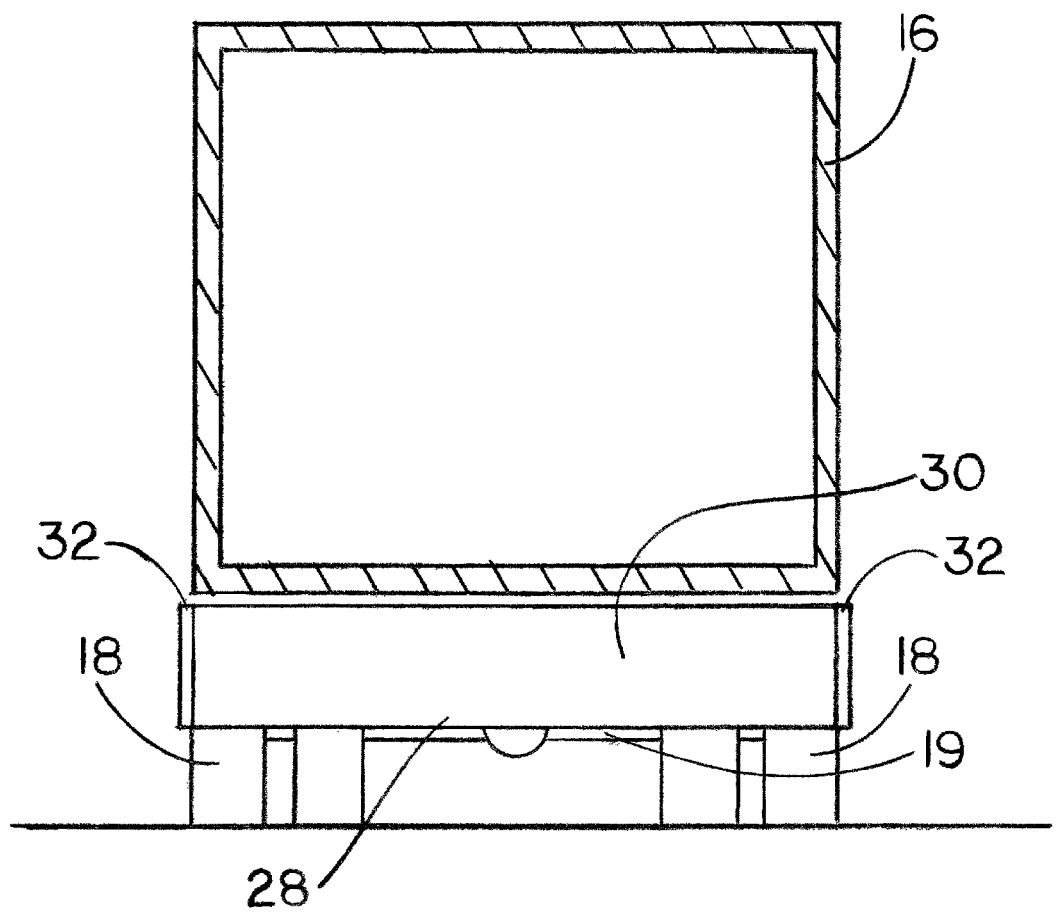
In FIG. 6, the channeled aerodynamic deflector panel assembly, which appears in side view similar to as shown in FIG. 4, is shown mounted on the trailer as viewed in cross-section from the front of the vehicle.

FIGS. 4 and 6

As shown in FIGS. 4 and 6, an embodiment comprises a channeled aerodynamic deflector panel assembly 30 attached to and mounted underneath the body of a trailer 16 for a commercial vehicle. The channeled deflector panel assembly 30 is located forward of the rear wheel assembly 17 and located in front of both trailing wheel sets 18 which would otherwise be exposed to headwinds when the vehicle is in forward motion. The channeled deflector panel assembly 30 includes a deflector plate 28 which is generally planar in shape, mounted inclined in a forwardly-angled orientation with the upper edge more forwardly-located and the lower surface located more rearward on the vehicle. The deflector plate 28 spans the lateral width of the trailer 16, and where directly aligned in front of the wheels ideally extends downward to no lower than the level of the axle 19. The channeled deflector panel assembly 30 includes forwardly-projecting end plates 32 attached to either side edge of the deflector plate 28, forming a channeled deflector panel assembly 30 to funnel headwinds directly onto the lower wheel surfaces and minimize any outwardly deflected headwind from otherwise impinging on the trailing upper wheel surfaces. Although not shown, between the wheel sets 18, the deflector plate 28 may extend further downward to deflect headwinds well below the central axle assembly 19.

The channeled deflector panel assembly 30 is located proximal to the trailing wheel set 18 in order to deflect headwinds onto the exposed lower wheel surfaces, and to deflect headwinds from directly impinging on the central axle assembly 19, thereby reducing overall vehicle drag and improving propulsive efficiency.

Fifth Embodiment

Figure 7:
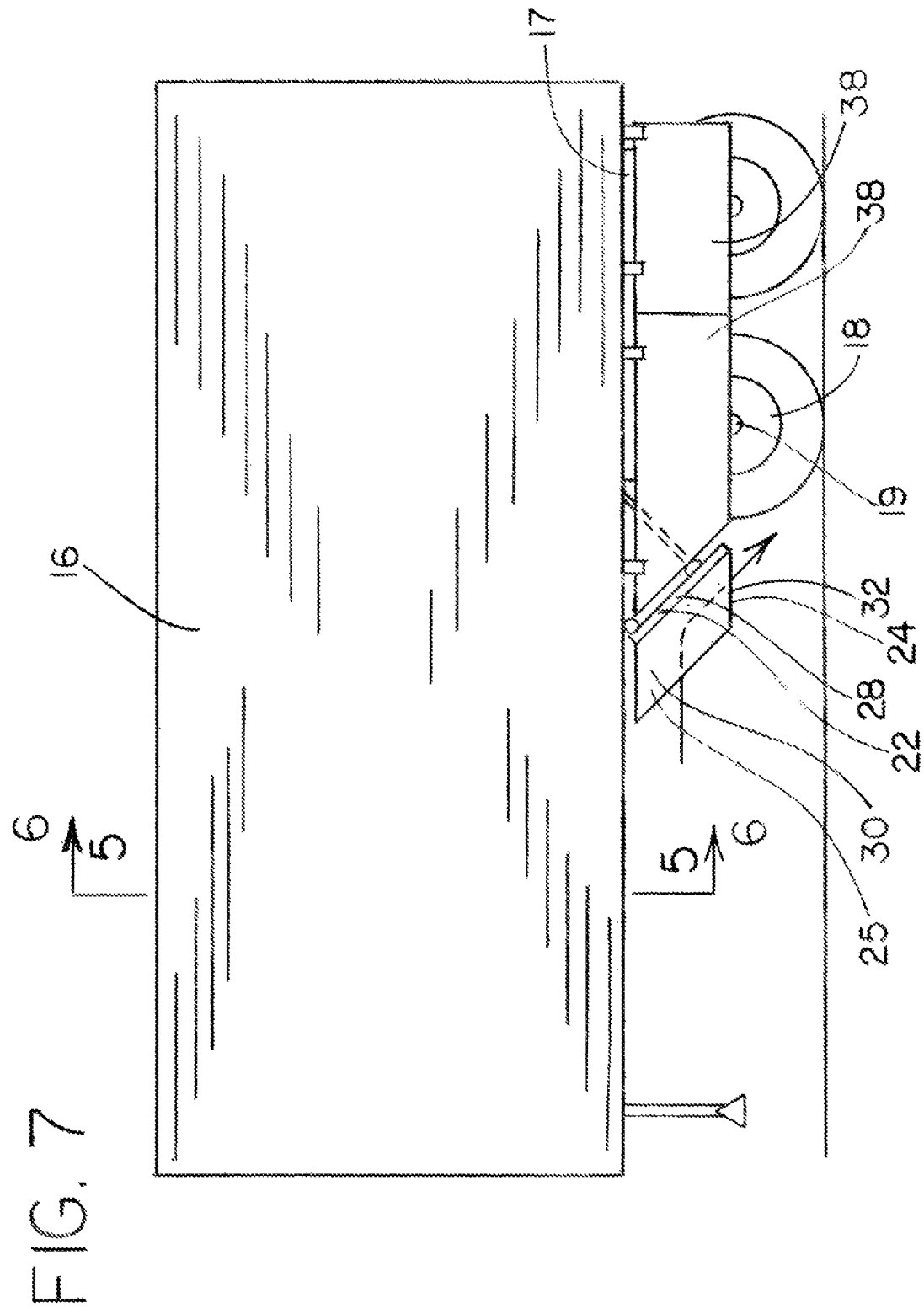
In FIG. 7, a channeled aerodynamic deflector panel and wheel skirt assembly is mounted underneath the trailer of an industrial truck in front of a wheel set of the rear wheel assembly.

FIGS. 7 and 5

As shown in FIG. 7 in side view, and as shown in FIG. 5 when viewed in cross-section from the front of the vehicle, an embodiment comprises the channeled aerodynamic wheel deflector panel assembly 25 identical to that of the third embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 22 rearward to cover adjacent trailing wheel sets 18, thereby shielding the trailing upper wheels from external headwinds. The channeled wheel deflector panel assembly 25 used in combination with the upper wheel skirt panels 38 reduces overall vehicle drag and improves propulsive efficiency.

Sixth Embodiment

FIGS. 7 and 6

As shown in FIG. 7 in side view, and as shown in FIG. 6 when viewed in cross-section from the front of the vehicle, an embodiment comprises the channeled aerodynamic deflector panel assembly 30 identical to that of the fourth embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 28 rearward to cover adjacent trailing wheel sets 18, thereby shielding the trailing upper wheels from external headwinds. The channeled deflector panel assembly 30 used in combination with the upper wheel skirt panels 38 reduces overall vehicle drag and improves propulsive efficiency.

Seventh Embodiment

Figure 8:
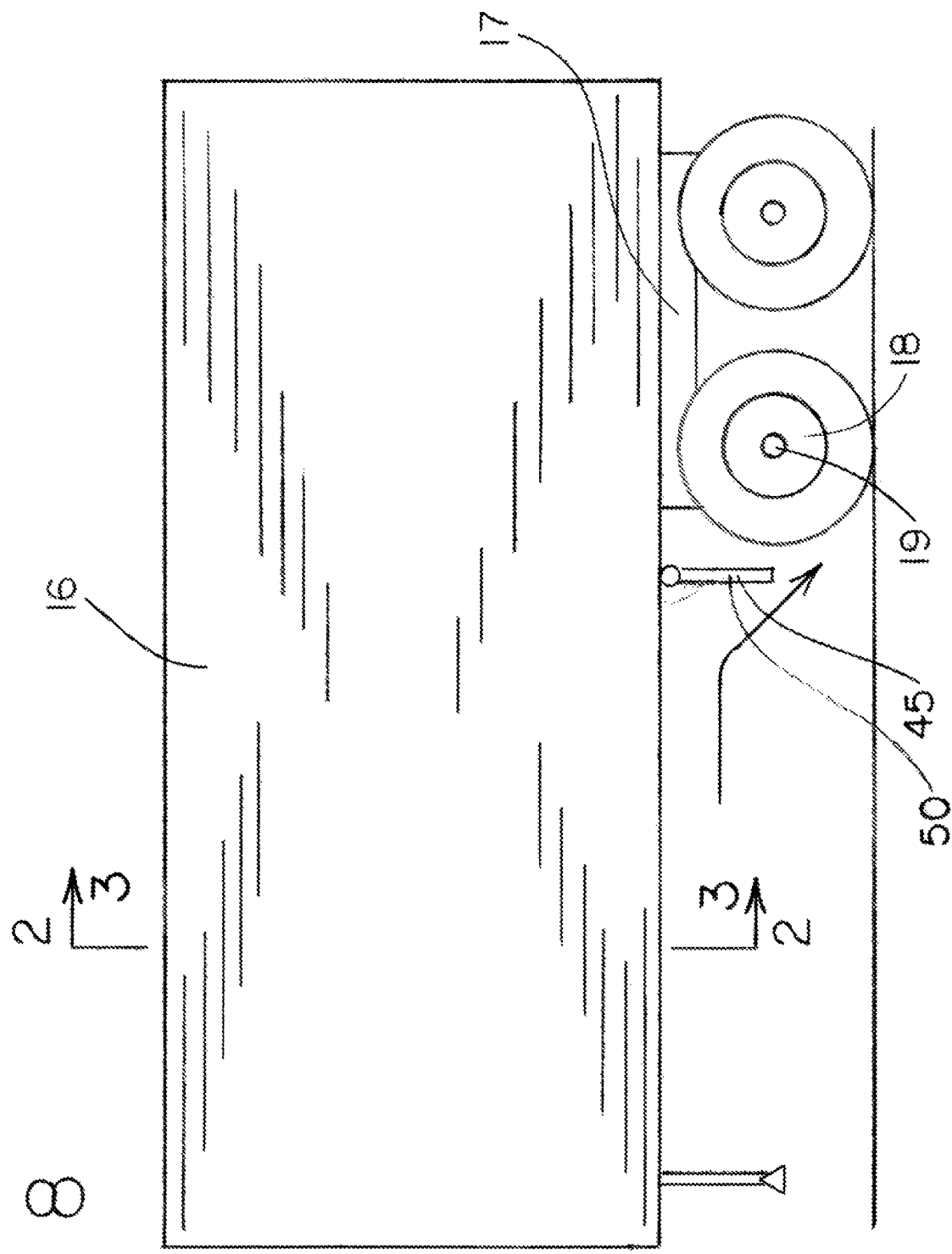
In FIG. 8, an aerodynamic wheel deflector panel is mounted underneath the trailer of an industrial truck in front of a wheel set of the rear wheel assembly.

FIGS. 8 and 2

As shown in FIG. 8 in side view, and as shown in FIG. 2 when viewed in cross-section from the front of the vehicle, an embodiment comprises an aerodynamic wheel deflector panel 45 is attached to and mounted underneath the body of a trailer 16 for a commercial vehicle. The wheel deflector panel 45 is located forward of the rear wheel assembly 17 and located in front of a trailing wheel set 18 which would otherwise be exposed to headwinds when the vehicle is in forward motion. The wheel deflector panel 45 is planar in shape, sufficiently wide to deflect headwinds from directly impinging on the upper wheels of the trailing wheel set, mounted vertically and shown oriented parallel to the axle 19. The wheel deflector panel 45 ideally extends downward to no lower than the level of the axle 19 and is located proximal to the trailing wheel set 18 in order to deflect headwinds substantially toward either the outside or the inside of the wheel set 18, or onto the lower wheel surfaces—thereby reducing overall vehicle drag and improving propulsive efficiency.

This simple wheel deflector panel configuration is appropriate for use when limited clearance space exists in front of the trailing wheel set.

Eighth Embodiment

FIGS. 8 and 3

As shown in FIG. 8 in side view, and as shown in FIG. 3 when viewed in cross-section from the front of the vehicle, an embodiment comprises an aerodynamic deflector panel 50 is attached to and mounted underneath the body of a trailer 16 for a commercial vehicle. The deflector panel 50 is located forward of the rear wheel assembly 17 and located in front of a trailing wheel sets 18 which would otherwise be exposed to headwinds when the vehicle is in forward motion. The deflector panel 50 is planar in shape, spans the lateral width of the trailer 16, and where aligned directly in front of the wheel sets 18 ideally extends downward to no lower than the level of the axle 19. The deflector panel 50 is mounted vertically and parallel to the axle 19. The deflector panel 50 is located proximal to the trailing wheel sets 18 in order to deflect headwinds substantially toward either the outside of the trailing upper wheels, under the central axle assembly, or onto the lower wheel surfaces—thereby reducing overall vehicle drag and improving propulsive efficiency.

This simple deflector panel configuration is appropriate for use when limited clearance space exists in front of the trailing wheel assembly.

Ninth Embodiment

Figure 9:
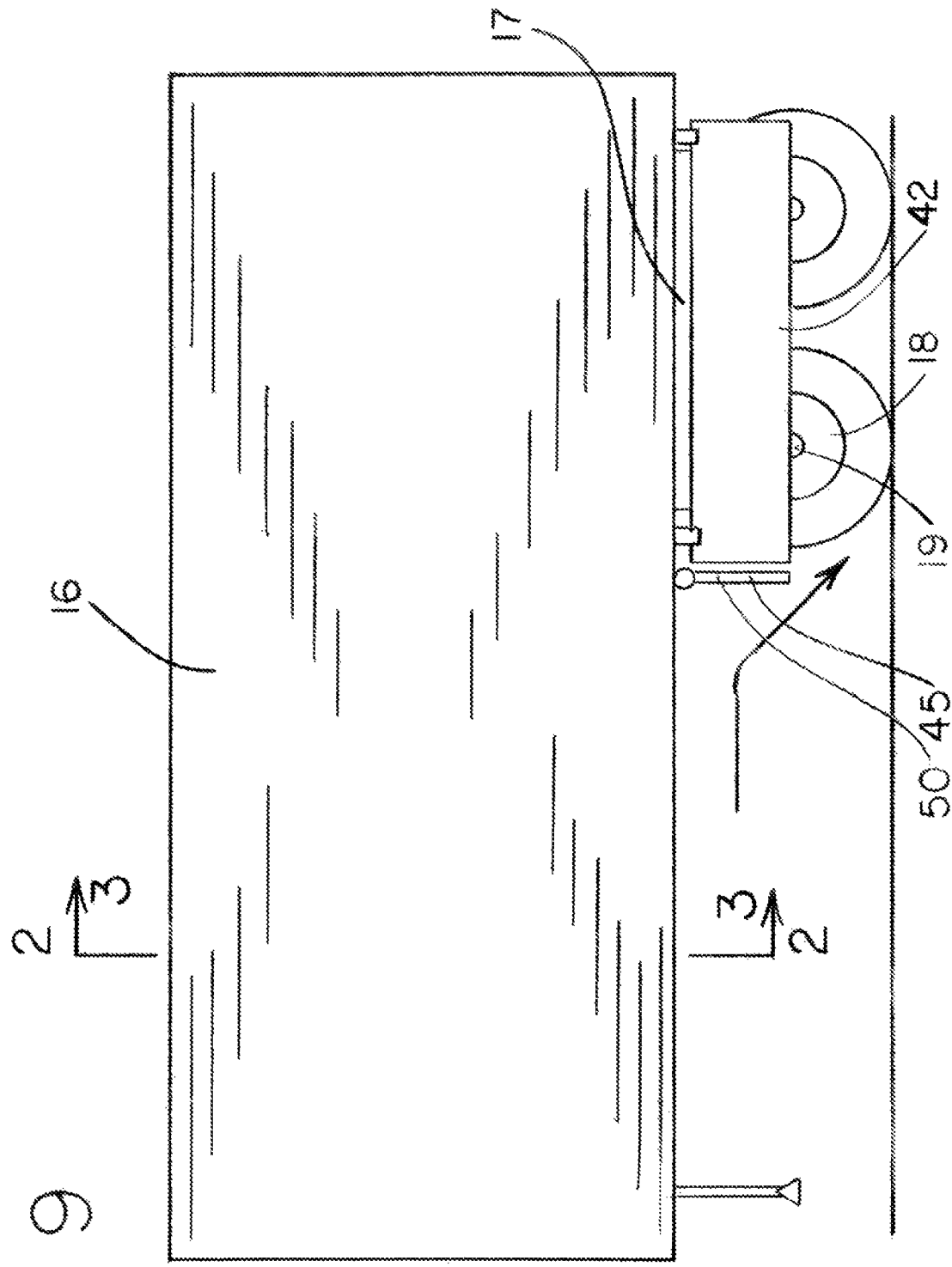
In FIG. 9, a aerodynamic deflector panel and wheel skirt assembly is mounted underneath the trailer of an industrial truck in front of the rear wheel assembly.

FIGS. 9 and 2

As shown in FIG. 9 in side view, and similar to as shown in FIG. 2 when viewed in cross-section from the front of the vehicle, an embodiment comprises the aerodynamic wheel deflector panel 45 identical to that of the seventh embodiment above, together with removable upper wheel skirt panels 42 covering the outside of the trailing wheel sets 18. The upper wheel skirt panels 42 also ideally extend downward to no lower than the level of the axle 19.

The upper wheel skirt panels 42 extend from the deflector panel 45 rearward to cover adjacent trailing wheel sets 18, thereby shielding the trailing upper wheels from external headwinds. The wheel deflector panel 45 used in combination with the upper wheel skirt panels 42 reduces overall vehicle drag and improves propulsive efficiency.

This simple wheel deflector panel configuration is appropriate for use when limited clearance space exists in front of the wheel sets and where the use of exterior wheel skirts panels is permitted.

Tenth Embodiment

FIGS. 9 and 3

As shown in FIG. 9 in side view, and similar to as shown in FIG. 3 when viewed in cross-section from the front of the vehicle, an embodiment comprises the aerodynamic wheel deflector panel 50 identical to that of the eighth embodiment above, together with removable upper wheel skirt panels 42 as used in the ninth embodiment above. The deflector panel 50 used in combination with the upper wheel skirt panels 42 reduces overall vehicle drag and improves propulsive efficiency.

This simple wheel deflector panel configuration is appropriate for use when limited clearance space exists in front of the wheel sets, where deflecting headwinds from directly impinging on the central axle assembly 19 is needed, and where the use of exterior wheel skirts panels is permitted.

Eleventh Embodiment

Figure 10:
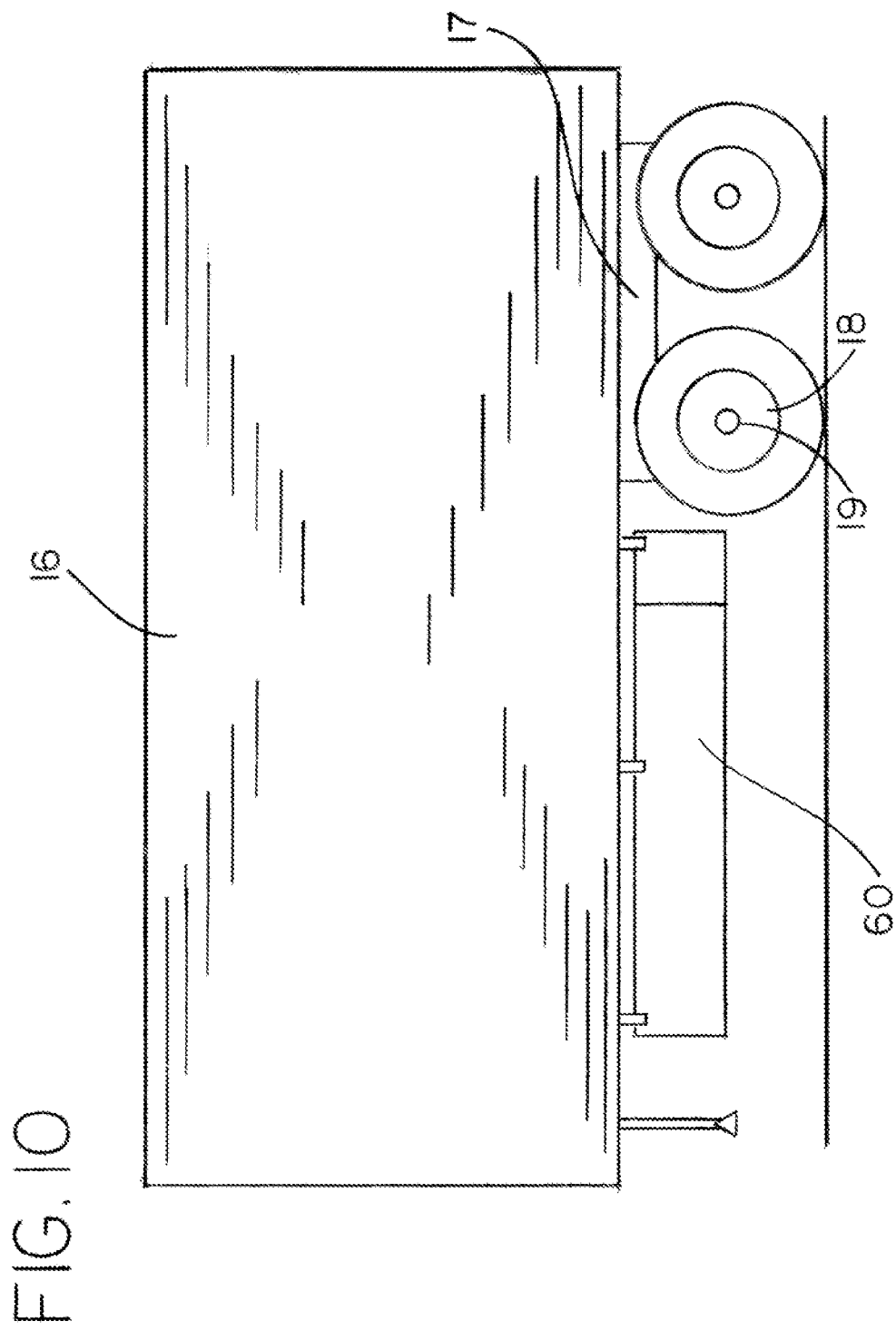
In FIG. 10, an aerodynamic deflector skirt assembly is mounted underneath the trailer of an industrial truck in front of the rear wheel assembly.

FIGS. 10 and 11

As shown in FIGS. 10 and 11, an embodiment comprises an aerodynamic vehicle skirt assembly 60 is attached to and mounted underneath the body of a trailer 16 for a commercial vehicle. The vehicle skirt assembly 60 is located forward of the rear wheel assembly 17 which would otherwise be exposed to headwinds when the vehicle is in forward motion. The vehicle skirt assembly 60 ideally extends downward to no lower than the level of the axle 19 of the trailing wheel set 18, leaving lower wheel surfaces of the trailing wheel set 18 exposed to headwinds.

The vehicle skirt assembly 60 is shown mounted to the trailer 16 with the forwardmost end of the vehicle skirt assembly 60 inset toward the centerline of the trailer 16 to a position in general longitudinal alignment with the inside of—and thereby substantially in front of—the innermost surface of the trailing wheel set 18. Extending rearward, the vehicle skirt assembly 60 progressively varies in position toward the outside of the body of the trailer 16, extending more rapidly toward the outside wheel when nearest the rear end, which is located proximate to the trailing wheel set 18. The rear end of the vehicle skirt assembly 60 is located near the outer side of the wheel set 18, thereby deflecting headwinds substantially toward the outside of the upper wheel surfaces and below onto the lower wheel surfaces.

The vehicle skirt assembly 60 may be constructed from either a single panel or from multiple panels arranged end-to-end. The vehicle skirt assembly 60 may be constructed with resilient materials, especially along the lower edge that may occasionally contact road obstacles. The vehicle skirt assembly 60 may also be mounted to the trailer 16 by deflectable resilient means, returning the vehicle skirt assembly 60 to the proper aerodynamic position after contacting road obstacles.

Twelfth Embodiment

FIG. 14

As shown in FIG. 14, an embodiment comprises the aerodynamic vehicle skirt assembly 60 identical to that of the eleventh embodiment above, together with removable upper wheel skirt panels 42 covering the outside of the trailing wheel sets 18 as used in the tenth embodiment above.

The upper wheel skirt panels 42 extend from the aerodynamic vehicle skirt assembly 60 rearward to cover adjacent trailing wheel sets 18, thereby ideally shielding the trailing upper wheel surfaces from external headwinds. The aerodynamic vehicle skirt assembly 60 used in combination with the upper wheel skirt panels 42 reduces overall vehicle drag and improves propulsive efficiency.

Advantages

From the description above, a number of advantages of some embodiments become evident:
(a) An improved aerodynamic wheel set deflector panel located in front of trailing wheels and ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.
(b) An improved aerodynamic wheel assembly deflector panel which may deflect headwinds below the central axle assembly, and where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.
(c) An improved aerodynamic deflector and skirt assembly where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.
(d) An improved aerodynamic vehicle skirt panel assembly ideally extending downward to no lower than the axle to thereby deflect headwinds onto mechanically disadvantaged lower wheel surfaces and to shield trailing mechanically-advantaged upper wheel surfaces from headwinds, reduces total weight of the skirt assembly, improves the skirt ground clearance of road obstacles, and reduces overall vehicle drag improving propulsive efficiency.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Furthermore, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

Moreover, since the lower wheel drag forces suffer a mechanical disadvantage over propulsive counterforces, using shielding devices to deflect headwinds from impinging on lower wheel surfaces can increase overall vehicle drag. Given these considerations, it becomes evident that drag-reducing vehicle deflectors and skirts should be ideally limited to lengths that inhibit vehicle headwinds from directly impinging on only the upper wheel surfaces, leaving the lower wheel surfaces exposed.

While the embodiments shown illustrate application generally to the trailers of industrial trucks, the embodiments could be similarly applied other trucks and vehicle types having wheel assemblies exposed to headwinds. And while the embodiments shown include skirt assemblies formed from relatively inexpensive flat panels, somewhat curved panels could also be used. Further examples of alternative embodiments include having deflector panels mounted at various angles, all ideally limited in height to extend downward to no lower than the level of the axle. Although not shown, in the case where additional space exists in front of the wheel assembly, the wheel deflector panel of the ninth embodiment could instead be mounted in nonparallel to the axle in order to deflect winds not only downward, but also to either side of the trailing wheel assembly.

In addition, the embodiments generally can include various methods of resilient mounting to the vehicle body permitting the panels to deflect when impacted by road obstructions and return undamaged to their normal aerodynamic position.

Accordingly, the embodiments should not be limited to the specific examples illustrated and described above, but rather to the appended claims and their legal equivalents.

I claim:
1. A wind-diverting apparatus for reducing propulsory counterforces required to countervail drag-induced resistive forces upon a terrestrial vehicle having a vehicle body supported thereunder by a rearward wheel assembly largely exposed to headwinds impinging substantially unimpeded thereon above an axle of the wheel assembly when the vehicle is in forward motion under a range of external headwind conditions including null wind conditions, comprising:
an aerodynamic deflector panel assembly attached to a nonrotatable structural member of a frame or a body of the vehicle employing the wheel assembly otherwise exposed to a headwind impinging substantially unimpeded wholly above a level of an axis of the axle directly upon a major primary vehicle-drag-inducing portion of forward-facing upper circumferential surfaces of a tire of said wheel assembly while the vehicle is in forward motion;

the wheel assembly comprising a forwardmost wheel of the vehicle wherein the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly;

the deflector panel assembly comprising one or more panels extending underneath the vehicle body while also being disposed upstream immediately in front of a trailing wheel set wherein the trailing wheel set comprises one or more of the forwardmost wheels located on one of either lateral side of the vehicle;

the deflector panel assembly itself being disposed wherein all headwind-exposed wholly planar portions thereof that are also located no higher than the level of the axis of the axle are each disposed in a substantially non-horizontal orientation with respect to the ground;

the deflector panel assembly itself being further disposed no further forward on the vehicle than a forwardmost vehicle landing gear extending downwards underneath the vehicle body;

a critically aligned upstream section of one or more of the upstream panels consisting of each portion of said upstream panels that is disposed immediately ahead of and is aligned horizontally level with and is aligned directly in front of any forward-facing circumferential tire surface of said trailing wheel set;

the critically aligned upstream section itself being disposed for a portion thereof to be aligned horizontally level with a critical vehicle-drag-inducing wheel surface of the trailing wheel set;

the critical vehicle-drag-inducing wheel surface comprising a primary drag-inducing portion of a major upper drag-inducing surface of the trailing wheel set that is located forward of the axle while also being centered about the level of a critical elevation that is itself centered in elevation about the major upper drag-inducing surface wherein the major upper drag-inducing surface itself comprises a portion of circumferential upper wheel surfaces that is centered around highly sensitive vehicle drag-inducing wheel surfaces located in the forward upper quadrant of the trailing wheel set;

the critically aligned upstream section spanning across the level of the critical elevation;

the critical elevation being positioned not lower than a level in elevation above the ground equal to 70 percent of the outer diameter of the trailing wheel set;

the critical wheel surface extending downwards nowhere lower than a minimum level in elevation above the ground equal to 60 percent of the outer diameter of the trailing wheel set;

the critically aligned upstream section being further disposed for a major portion thereof further comprising a portion of the critically aligned upstream section that itself spans from in-between a top edge and a bottom edge of the critically aligned upstream section to itself further span laterally a sufficient distance across the vehicle in front of the trailing wheel set to thereby extend said major portion of the critically aligned upstream section itself laterally across distinctly more than halfway across a lateral distance equal to the full lateral width of the trailing wheel set;

the critically aligned upstream section further extending nowhere lower than a downward level positioned not lower in elevation above the ground than a lowermost level that is itself located at the axis of the axle whereby forward-facing circumferential tire surfaces of the trailing wheel set that are located below the downward level remain exposed to headwinds impinging thereon; and the critically aligned upstream section being further disposed immediately adjacent to the trailing wheel set to thereby deflect a substantial portion of the headwind downward onto exposed forward-facing circumferential tire surfaces of said trailing wheel set that are located lower than the downward level, whereby the critically aligned upstream section itself can be disposed to extend no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause a vehicle propulsory counterforce itself to increase above an amount required when the critically aligned upstream section is otherwise absent from the vehicle wherein the vehicle propulsory counterforce is the propulsive force required to countervail an overall vehicle drag force consisting of a net wheel drag force upon the trailing wheel set as magnified against the axle combined with a critical deflector drag force induced solely from headwinds impinging upon the critically aligned upstream section of the deflector panel assembly, whereby any effective reduction in drag upon said trailing wheel set as reflected through the vehicle frame and thereby as countervailed by vehicle propulsive counterforces is not less than the offsetting effective vehicle drag induced by the critically aligned upstream section itself being directly attached to the vehicle frame.

2. The apparatus of claim 1, wherein:

the critically aligned upstream section is further disposed immediately adjacent to the trailing wheel set at a forwardly inclined angle to deflect a major portion of the headwind both downward and rearward onto exposed forward-facing circumferential tire surfaces of said trailing wheel set; and the critically aligned upstream section is further disposed wholly within an upstream distance ahead of the trailing wheel set equal to 200 percent of the outer diameter of said trailing wheel set.

3. The apparatus of claim 2, wherein:

the deflector panel assembly is further disposed wholly on one of either lateral side of the vehicle; and the critically aligned upstream section is limited in total length thereof to a distance along the forward direction of the vehicle that is no greater than that equal to 150 percent of the outer diameter of the trailing wheel set.

4. The apparatus of claim 3, wherein the deflector panel assembly is limited in lateral width to the lateral width of the critically aligned upstream section.

5. The apparatus of claim 1, further comprising:

a plurality of lateral end plates with each said end plate attached to a lateral side of one of the one or more critically aligned upstream sections and arranged parallel to the lengthwise sides of the vehicle body while also projecting forwardly to form a channel within said deflector panel assembly;

the critically aligned upstream section itself having one said end plate attached to the outermost lateral side thereof wherein the outermost lateral side is that side of the upstream section that is positioned nearest the outer lateral side of the vehicle body corresponding thereto;

the critically aligned upstream section itself being further disposed immediately adjacent to the trailing wheel set at a forwardly inclined angle to deflect and channel a major portion of the headwind both downward and rearward onto exposed forward-facing circumferential tire surfaces of said trailing wheel set; and the critically aligned upstream section itself being further disposed wholly within an upstream distance ahead of the trailing wheel set equal to 200 percent of the outer diameter of said trailing wheel set.

6. The apparatus of claim 5, wherein the deflector panel assembly is further disposed wholly on one of either lateral side of the vehicle.

7. The apparatus of claim 1, wherein the deflector panel assembly is further disposed wholly on one of either lateral side of the vehicle.

8. The apparatus of claim 7, wherein:
the deflector panel assembly is limited in lateral width to the lateral width of the critically aligned upstream section; and
the deflector panel assembly is further disposed wholly within an upstream distance ahead of the trailing wheel set equal to 100 percent of the outer diameter of said trailing wheel set.

9. The apparatus of claim 8, wherein the deflector panel assembly is further disposed wholly within an upstream distance ahead of the trailing wheel set equal to 50 percent of the outer diameter of said trailing wheel set.

10. The apparatus of claim 8, wherein the deflector panel assembly is further disposed wholly within an upstream distance ahead of the trailing wheel set equal to 25 percent of the outer diameter of said trailing wheel set.

11. The apparatus of claim 8, wherein the lowermost level is located at an elevation above the ground equal to 60 percent of the outer diameter of the trailing wheel set.

12. The apparatus of claim 7, further comprising:
the deflector panel assembly being further disposed wholly on one lateral side apart from a longitudinal centerline of the vehicle body;
the deflector panel assembly wherein a wind-deflecting portion thereof consisting of each portion of the deflector panel assembly that is disposed wholly forward of the wheel set being itself further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the trailing wheel set wherein the deflector panel assembly comprises a vehicle body skirt assembly disposed lengthwise largely along a longitudinal side of the vehicle; and
said wind-deflecting portion being disposed to progress steadily laterally outward away from the longitudinal centerline along the major length thereof from the forward wind-deflecting portion end thereof to the rearward wind-deflecting portion end thereof.

13. The apparatus of claim 7, further comprising;
the deflector panel assembly being further disposed wholly on one lateral side apart from a longitudinal centerline of the vehicle body;
the deflector panel assembly further comprising a wind-deflecting portion thereof consisting of each portion of the deflector panel assembly that is disposed wholly forward of the wheel set wherein the wind-deflecting portion itself comprises two or more of said upstream panels;
the deflector panel assembly wherein the wind-deflecting portion itself being further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the wheel set and with an intermediate wind-deflecting portion thereof further comprising an angled intersection between the two or more said upstream panels wherein the angled intersection itself being located in-between the forward wind-deflecting portion end and the rearward wind-deflecting portion end and wherein the deflector panel assembly thereby comprising a vehicle body skirt assembly disposed lengthwise largely along a longitudinal side of the vehicle;
the rearmost of the two or more said upstream panels being disposed to progress steadily laterally outward away from the longitudinal centerline along the major length thereof while extending from a forward panel end thereof to a rearward panel end thereof; and
the forwardmost of the two or more said upstream panels being disposed wherein a forward panel end thereof is disposed laterally outward no further from the centerline of the vehicle body than a rearward panel end thereof.

14. The apparatus of claim 1, wherein on an otherwise exposed upper outer lateral side of the trailing wheel set the deflector panel assembly further comprising a wheel skirt panel located immediately adjacent to the exposed outer lateral side of said wheel assembly with the adjacent wheel skirt panel itself comprising only deflector panel assembly surfaces located wholly on the same corresponding side of said wheel assembly and further comprising said wheel skirt panel extending downward nowhere lower in elevation above the ground than a lower skirt level that is itself positioned distinctly just above the axis of the axle.

15. The apparatus of claim 14, wherein both the lowermost level and the lower skirt level are each located at an elevation above the ground equal to 60 percent of the outer diameter of the trailing wheel set.

16. The apparatus of claim 1, wherein the lowermost level is located at an elevation above the ground equal to 60 percent of the outer diameter of the trailing wheel set.

17. The apparatus of claim 1, wherein the critically aligned upstream section is disposed to sufficiently extend no further downwards and no further forward of the trailing wheel set than to an optimal combined forward and downward disposition thereof so that when taken all together while the vehicle is operated at 65 km/h under null wind conditions the vehicle propulsory counterforce is minimized.

18. A wind-diverting apparatus for reducing propulsory counterforces required to countervail drag-induced resistive forces upon a terrestrial vehicle having a vehicle body supported thereunder by a rearward wheel assembly largely exposed to headwinds impinging substantially unimpeded thereon above an axle of the wheel assembly when the vehicle is in forward motion under a range of external headwind conditions including null wind conditions, comprising:

an aerodynamic deflector panel assembly attached to a nonrotatable structural member of a frame or a body of the vehicle employing the wheel assembly otherwise exposed to a headwind impinging substantially unimpeded wholly above a level of an axis of the axle directly upon a major primary vehicle-drag-inducing portion of forward-facing upper circumferential surfaces of a tire of said wheel assembly while the vehicle is in forward motion;

the wheel assembly comprising a forwardmost wheel of the vehicle wherein the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly;

the deflector panel assembly comprising one or more panels extending underneath the vehicle body while also being disposed upstream immediately in front of a trailing wheel set wherein the trailing wheel set comprises one or more of the forwardmost wheels located on one of either lateral side of the vehicle;

the deflector panel assembly being disposed wholly on one of either lateral side of the vehicle;

the deflector panel assembly itself being further disposed wherein all headwind-exposed wholly planar portions thereof that are also located no higher than the level of the axis of the axle are each disposed in a substantially non-horizontal orientation with respect to the ground;

the deflector panel assembly itself being further disposed no further forward on the vehicle than a forwardmost vehicle landing gear extending downwards underneath the vehicle body;

a critically aligned upstream section of one or more of the upstream panels consisting of each portion of said upstream panels that is disposed immediately ahead of and is aligned horizontally level with and is aligned directly in front of any forward-facing circumferential tire surface of said trailing wheel set;

the critically aligned upstream section itself being disposed for a portion thereof to be aligned horizontally level with a critical vehicle-drag-inducing wheel surface of the trailing wheel set;

the critical vehicle-drag-inducing wheel surface comprising a primary drag-inducing portion of a major upper drag-inducing surface of the trailing wheel set that is located forward of the axle while also being centered about the level of a critical elevation that is itself centered in elevation about the major upper drag-inducing surface wherein the major upper drag-inducing surface itself comprises a portion of circumferential upper wheel surfaces that is centered around highly sensitive vehicle drag-inducing wheel surfaces located in the forward upper quadrant of the trailing wheel set;

the critically aligned upstream section spanning across the level of the critical elevation;

the critical elevation being positioned not lower than a level in elevation above the ground equal to 70 percent of the outer diameter of the trailing wheel set;

the critical wheel surface extending downwards nowhere lower than a minimum level in elevation above the ground equal to 60 percent of the outer diameter of the trailing wheel set;

the critically aligned upstream section being further disposed for a major portion thereof further comprising a portion of the critically aligned upstream section that itself spans from in-between a top edge and a bottom edge of the critically aligned upstream section to itself further span laterally a sufficient distance across the vehicle in front of the trailing wheel set to thereby extend said major portion of the critically aligned upstream section itself laterally across distinctly more than halfway across a lateral distance equal to the full lateral width of the trailing wheel set;

the critically aligned upstream section further extending nowhere lower than a downward level positioned not lower in elevation above the ground than a lowermost level that is itself located at an elevation above the ground equal to one-third of the outer diameter of the trailing wheel set whereby the most propulsory mechanically disadvantaged forward-facing circumferential tire surfaces are located below the lowermost level and are thereby exposed to headwinds that are deflected downwards by the critically aligned upstream section; and the critically aligned upstream section being further disposed immediately adjacent to the trailing wheel set to thereby deflect a substantial portion of the headwind downward onto exposed forward-facing circumferential tire surfaces of said trailing wheel set that are located lower than the downward level, whereby the critically aligned upstream section itself can be disposed to extend no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause a vehicle propulsory counterforce itself to increase above an amount required when the critically aligned upstream section is otherwise absent from the vehicle wherein the vehicle propulsory counterforce is the propulsive force required to countervail an overall vehicle drag force consisting of a net wheel drag force upon the trailing wheel set as magnified against the axle combined with a critical deflector drag force induced solely from headwinds impinging upon the critically aligned upstream section of the deflector panel assembly, whereby any effective reduction in drag upon said trailing wheel set as reflected through the vehicle frame and thereby as countervailed by vehicle propulsive counterforces is not less than the offsetting effective vehicle drag induced by the critically aligned upstream section itself being directly attached to the vehicle frame.

19. The apparatus of claim 18, wherein:

the critically aligned upstream section is further disposed immediately adjacent to the trailing wheel set at a forwardly inclined angle to deflect a major portion of the headwind both downward and rearward onto exposed forward-facing circumferential tire surfaces of said trailing wheel set;

a rearmost portion of the critically aligned upstream section is disposed within a minimum upstream distance ahead of the trailing wheel set equal to 100 percent of the outer diameter of said trailing wheel set; and the critically aligned upstream section is disposed wholly within a maximum upstream distance ahead of the trailing wheel set equal to 300 percent of the outer diameter of said trailing wheel set.

20. The apparatus of claim 19, wherein the critically aligned upstream section is limited in total length thereof to a distance along the forward direction of the vehicle that is no greater than that equal to 250 percent of the outer diameter of the trailing wheel set.

21. The apparatus of claim 20, wherein the deflector panel assembly is limited in lateral width to the lateral width of the critically aligned upstream section.

22. The apparatus of claim 18, further comprising:
a plurality of lateral end plates with each said end plate attached to a lateral side of one of the one or more critically aligned upstream sections and arranged parallel to the lengthwise sides of the vehicle body while also projecting forwardly to form a channel within said deflector panel assembly;
the critically aligned upstream section itself having one said end plate attached to the outermost lateral side thereof wherein the outermost lateral side is that side of the upstream section that is positioned nearest the outer lateral side of the vehicle body corresponding thereto;
the critically aligned upstream section being further disposed immediately adjacent to the trailing wheel set at a forwardly inclined angle to deflect and channel a major portion of the headwind both downward and rearward onto exposed forward-facing circumferential tire surfaces of said trailing wheel set;
a rearmost portion of the critically aligned upstream section being disposed within a minimum upstream distance ahead of the trailing wheel set equal to 100 percent of the outer diameter of said trailing wheel set; and
the critically aligned upstream section being disposed wholly within a maximum upstream distance ahead of the trailing wheel set equal to 300 percent of the outer diameter of said trailing wheel set.

23. The apparatus of claim 22, wherein the critically aligned upstream section itself is limited in total length thereof to a distance along the forward direction of the vehicle that is no greater than that equal to 250 percent of the outer diameter of the trailing wheel set.

24. The apparatus of claim 18, wherein the deflector panel assembly is limited in lateral width to the lateral width of the critically aligned upstream section.

25. The apparatus of claim 18, further comprising:
the deflector panel assembly being further disposed wholly on one lateral side apart from a longitudinal centerline of the vehicle body;
the deflector panel assembly wherein a wind-deflecting portion thereof consisting of each portion of the deflector panel assembly that is disposed wholly forward of the wheel set being itself further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the trailing wheel set wherein the deflector panel assembly comprises a vehicle body skirt assembly disposed lengthwise largely along a longitudinal side of the vehicle; and
said wind-deflecting portion being disposed to progress steadily laterally outward away from the longitudinal centerline along the major length thereof from the forward wind-deflecting portion end thereof to the rearward wind-deflecting portion end thereof.

26. The apparatus of claim 25, wherein the lowermost level is located at an elevation above the ground equal to 40 percent of the outer diameter of the trailing wheel set.

27. The apparatus of claim 26, wherein said major portion of the critically aligned upstream section itself spans laterally across no less than 75 percent of the distance across the full lateral width of the trailing wheel set.

28. The apparatus of claim 25, wherein said major portion of the critically aligned upstream section itself spans laterally across no less than 75 percent of the distance across the full lateral width of the trailing wheel set.

29. The apparatus of claim 25, wherein said major portion of the critically aligned upstream section itself spans laterally across no less than the full lateral width of the trailing wheel set.

30. The apparatus of claim 18, further comprising:
the deflector panel assembly being further disposed wholly on one lateral side apart from a longitudinal centerline of the vehicle body;
the deflector panel assembly further comprising a wind-deflecting portion thereof consisting of each portion of the deflector panel assembly that is disposed wholly forward of the wheel set wherein the wind-deflecting portion itself comprises two or more of said upstream panels;
the deflector panel assembly wherein the wind-deflecting portion itself being further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the wheel set and with an intermediate wind-deflecting portion thereof further comprising an angled intersection between the two or more said upstream panels wherein the angled intersection itself being located in-between the forward wind-deflecting portion end and the rearward wind-deflecting portion end and wherein the deflector panel assembly thereby comprising a vehicle body skirt assembly disposed lengthwise largely along a longitudinal side of the vehicle;
the rearmost of the two or more said upstream panels being disposed to progress steadily laterally outward away from the longitudinal centerline along the major length thereof while extending from a forward panel end thereof to a rearward panel end thereof; and
the forwardmost of the two or more said upstream panels being disposed wherein a forward panel end thereof is disposed laterally outward no further from the centerline of the vehicle body than a rearward panel end thereof.

31. The apparatus of claim 18, wherein on an otherwise exposed upper outer lateral side of the trailing wheel set said deflector panel assembly further comprises a wheel skirt panel located immediately adjacent to the exposed outer lateral side of said wheel assembly with the adjacent wheel skirt panel itself comprising only deflector panel assembly surfaces located wholly on the same corresponding side of said wheel assembly and further comprising said wheel skirt panel extending downward nowhere lower in elevation above the ground than a lower skirt level that is itself positioned at the axis of the axle.

32. The apparatus of claim 18, wherein the lowermost level is located at an elevation above the ground equal to 40 percent of the outer diameter of the trailing wheel set.

33. The apparatus of claim 18, wherein said major portion of the critically aligned upstream section itself spans laterally across no less than the full lateral width of the trailing wheel set.

34. The apparatus of claim 18, wherein the critically aligned upstream section is further disposed to extend no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause the vehicle propulsory counterforce itself to increase above an amount required when the critically aligned upstream section is otherwise absent from the vehicle.

35. A method for reducing propulsory counterforces required to countervail drag-induced resistive forces upon a terrestrial vehicle having a vehicle body supported thereunder by a forwardmost wheel of a wheel assembly wherein the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly and wherein when the vehicle is in forward motion under a range of external headwind conditions including null headwind conditions the wheel assembly is otherwise exposed to an oncoming headwind impinging substantially unimpeded wholly above a level of an axis of an axle of said wheel assembly directly upon a major primary vehicle-drag-inducing portion of forward-facing upper circumferential surfaces of a tire of said forwardmost wheel, comprising:
  forming a deflector panel assembly comprising one or more aerodynamic panels;
  attaching the deflector panel assembly to a nonrotatable structural member of a frame or a body of the vehicle wherein the deflector panel assembly extends underneath the vehicle body while also being disposed upstream immediately in front of a trailing wheel set wherein the trailing wheel set comprises one or more of the forwardmost wheels located on one of either lateral side of the vehicle;
  arranging the deflector panel assembly to be disposed no further forward on the vehicle than a forwardmost vehicle landing gear extending downwards underneath the vehicle body;
  arranging one or more of the aerodynamic panels to be disposed immediately upstream and aligned directly in front of the trailing wheel set wherein the deflector panel assembly comprises a critically aligned upstream section of the one or more of the aerodynamic panels consisting of each portion of said aerodynamic panels that is disposed immediately ahead of and is aligned horizontally level with and is aligned directly in front of any forward-facing circumferential tire surface of said trailing wheel set;
  arranging the critically aligned upstream section itself to be disposed for a portion thereof to be aligned horizontally level with a critical vehicle-drag-inducing wheel surface of the trailing wheel set wherein the critical vehicle-drag-inducing wheel surface itself comprises a primary drag-inducing portion of a major upper drag-inducing surface of the trailing wheel set that is located forward of the axle while also being centered about the level of a critical elevation that is itself centered in elevation about the major upper drag-inducing surface and wherein the major upper drag-inducing surface itself comprises a portion of circumferential upper wheel surfaces that is centered around highly sensitive vehicle drag-inducing wheel surfaces located in the forward upper quadrant of the trailing wheel set;
  arranging the critically aligned upstream section to span across the level of the critical elevation wherein the critical elevation is positioned not lower than a level in elevation above the ground equal to 70 percent of the outer diameter of the trailing wheel set and wherein the critical wheel surface extends downward nowhere lower than a minimum level in elevation above the ground equal to 60 percent of the outer diameter of the trailing wheel set;
  arranging the critically aligned upstream section to be further disposed for a major portion thereof to further comprise a portion of the critically aligned upstream section spanning from in-between a top edge and a bottom edge of the critically aligned upstream section to itself further span laterally a sufficient distance across the vehicle in front of the trailing wheel set to thereby extend said major portion of the critically aligned upstream section itself laterally across distinctly more than halfway across a lateral distance equal to the full lateral width of the trailing wheel set;
  arranging the critically aligned upstream section to further extend nowhere lower than a downward level positioned not lower in elevation above the ground than a lowermost level that is itself located at the axis of the axle whereby forward-facing circumferential tire surfaces of the trailing wheel set that are located below the downward level remain exposed to headwinds impinging thereon; and
  arranging the critically aligned upstream section to be further disposed immediately adjacent to the trailing wheel set to thereby deflect a substantial portion of the headwind downward onto exposed forward-facing circumferential tire surfaces of said trailing wheel set; and
  arranging the critically aligned upstream section to be limited in overall drag-inducing surface extension by the critically aligned upstream section itself extending no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause a vehicle propulsory counterforce itself to increase above an amount required when the critically aligned upstream section is otherwise absent from the vehicle wherein the vehicle propulsory counterforce is the propulsive force required to countervail an overall vehicle drag force consisting of a net wheel drag force upon the trailing wheel set as magnified against the axle combined with a critical deflector drag force induced solely from headwinds impinging upon the critically aligned upstream section of the deflector panel assembly, whereby any effective reduction in drag upon said trailing wheel set as reflected through the vehicle frame and thereby as countervailed by vehicle propulsive counterforces is not less than the offsetting effective vehicle drag induced by the critically aligned upstream section itself being directly attached to the vehicle frame and whereby the deflector panel assembly can be disposed to yield an increase in vehicle propulsive efficiency exceeding any decrease in vehicle propulsive efficiency caused by any increased drag on the mechanically de-magnified lower wheel surfaces combined with any drag induced upon the deflector panel assembly itself.

36. The method of claim 35, wherein:

the critically aligned upstream section is arranged to be further disposed immediately adjacent to the trailing wheel set at a forwardly inclined angle to deflect a major portion of the headwind both downward and rearward onto exposed forward-facing circumferential tire surfaces of said trailing wheel set;

a rearmost portion of the critically aligned upstream section is arranged to be disposed within a minimum upstream distance ahead of the trailing wheel set equal to 100 percent of the outer diameter of said trailing wheel set; and the critically aligned upstream section is arranged to be further disposed no further forward than within a maximum upstream distance ahead of the trailing wheel set equal to 300 percent of the outer diameter of said trailing wheel set.

37. The method of claim 36, wherein:

the deflector panel assembly is arranged to be further disposed wholly on one of either lateral side of the vehicle; and the critically aligned upstream section is arranged to be limited in total length spanning a distance along the forward direction of the vehicle to no greater than that equal to 250 percent of the outer diameter of the trailing wheel set.

38. The method of claim 37, wherein the deflector panel assembly is arranged to be limited in lateral width to the lateral width of the critically aligned upstream section.

39. The method of claim 35, further comprising:

arranging a plurality of lateral end plates wherein each said end plate is attached to a lateral side of one of the one or more critically aligned upstream sections and arranged parallel to the lengthwise sides of the vehicle body while also projecting forwardly to form a channel within said deflector panel assembly;

arranging the critically aligned upstream section itself to have one said end plate attached to the outermost lateral side thereof wherein the outermost lateral side is that side of the upstream section that is positioned nearest the outer lateral side of the vehicle body corresponding thereto;

arranging the critically aligned upstream section to be further disposed immediately adjacent to the trailing wheel set at a forwardly inclined angle to deflect and channel a major portion of the headwind both downward and rearward onto exposed forward-facing circumferential tire surfaces of said trailing wheel set;

arranging a rearmost portion of the critically aligned upstream section to be disposed within a minimum upstream distance ahead of the trailing wheel set equal to 100 percent of the outer diameter of said trailing wheel set; and arranging the critically aligned upstream section to be further disposed no further forward than within a maximum upstream distance ahead of the trailing wheel set equal to 300 percent of the outer diameter of said trailing wheel set.

40. The method of claim 39, wherein:

the deflector panel assembly is arranged to be further disposed wholly on one of either lateral side of the vehicle; and the critically aligned upstream section is arranged to be limited in total length spanning a distance along the forward direction of the vehicle to no greater than that equal to 250 percent of the outer diameter of the trailing wheel set.

41. The method of claim 35, wherein the deflector panel assembly is arranged to be further disposed wholly on one of either lateral side of the vehicle.

42. The method of claim 41, wherein:

the deflector panel assembly is arranged to be further disposed in a substantially vertical orientation;

the deflector panel assembly is arranged to be further disposed wholly within an upstream distance ahead of the trailing wheel set equal to 25 percent of the outer diameter of said trailing wheel set; and the deflector panel assembly is arranged to be limited in lateral width to the lateral width of the critically aligned upstream section.

43. The method of claim 35, further comprising:

arranging the deflector panel assembly to be further disposed wholly on one lateral side apart from a longitudinal centerline of the vehicle body;

arranging the deflector panel assembly wherein a wind-deflecting portion thereof consisting of each portion of the deflector panel assembly that is disposed wholly forward of the wheel set being itself further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the trailing wheel set wherein the deflector panel assembly comprises a vehicle body skirt assembly disposed lengthwise largely along a longitudinal side of the vehicle; and arranging said wind-deflecting portion to be disposed to progress steadily laterally outward away from the longitudinal centerline along the major length thereof from the forward wind-deflecting portion end thereof to the rearward wind-deflecting portion end thereof.

44. The method of claim 43, wherein said major portion of the critically aligned upstream section is arranged to span laterally across no less than 75 percent of the distance across the full lateral width of the trailing wheel set.

45. The method of claim 43, wherein said major portion of the critically aligned upstream section is arranged to span laterally across no less than the full lateral width of the trailing wheel set.

46. The method of claim 43, wherein the lowermost level is located distinctly just above the axis of the axle.

47. The method of claim 46, wherein said major portion of the critically aligned upstream section is arranged to span laterally across no less than the full lateral width of the trailing wheel set.

48. The method of claim 43, wherein:
said major portion of the critically aligned upstream section is arranged to span laterally across no less than the full lateral width of the trailing wheel set; and
the deflector panel assembly is arranged to be further disposed wholly within a maximum upstream distance ahead of the trailing wheel set wherein the maximum upstream distance is equal to the greater either of two-thirds of the distance in-between said trailing wheel set and the forwardmost vehicle landing gear or of a distance equal to 500 percent of the outer diameter of said trailing wheel set.

49. The method of claim 35, further comprising;
arranging the deflector panel assembly to be further disposed wholly on one lateral side apart from a longitudinal centerline of the vehicle body;
arranging the deflector panel assembly to further comprise a wind-deflecting portion thereof consisting of each portion of the deflector panel assembly that is disposed wholly forward of the wheel set wherein the wind-deflecting portion itself comprises two or more of said upstream panels;
arranging the deflector panel assembly wherein the wind-deflecting portion itself being further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the wheel set and with an intermediate wind-deflecting portion thereof further comprising an angled intersection between the two or more said upstream panels wherein the angled intersection itself is located in-between the forward wind-deflecting portion end and the rearward wind-deflecting portion end and wherein the deflector panel assembly thereby comprises a vehicle body skirt assembly disposed lengthwise largely along a longitudinal side of the vehicle; and
arranging the rearmost of the two or more said upstream panels to progress steadily laterally outward away from the longitudinal centerline along the major length thereof while extending from a forward panel end thereof to a rearward panel end thereof.

50. The method of claim 35, further comprising:
arranging the deflector panel assembly wherein on an otherwise exposed upper outer lateral side of the trailing wheel set said deflector panel assembly further comprising a wheel skirt panel located immediately adjacent to the exposed outer lateral side of the wheel assembly with the adjacent wheel skirt panel itself comprising only deflector panel assembly surfaces located wholly on the same corresponding side of said wheel assembly and further comprising said wheel skirt panel extending downward nowhere lower in elevation above the ground than a lower skirt level that is itself positioned at an elevation above the ground equal to sixty percent of the outer diameter of the trailing wheel set; and
arranging the adjacent wheel skirt panel itself to further extend no further downwards and no further forward or rearward of the trailing wheel set than when taken all together while the vehicle is operated at 65 km/h under null wind conditions increased drag induced upon increasingly extended surfaces of the adjacent wheel skirt panel would then more than fully offset reduced effective drag on corresponding adjacent surfaces of said trailing wheel set and would thereby cause propulsive efficiency of the vehicle to decrease below an amount at which the adjacent wheel skirt panel were otherwise absent from the vehicle.

51. The method of claim 35, wherein said major portion of the critically aligned upstream section is arranged to span laterally across no less than the full lateral width of the trailing wheel set.

52. The method of claim 35, wherein the lowermost level is located at an elevation above the ground equal to 60 percent of the outer diameter of the trailing wheel set.

53. A method for reducing propulsory counterforces required to countervail drag-induced resistive forces upon a terrestrial vehicle having a vehicle body supported thereunder by a forwardmost wheel of a wheel assembly wherein the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly and wherein when the vehicle is in forward motion under a range of external headwind conditions including null headwind conditions the wheel assembly is otherwise exposed to an oncoming headwind impinging substantially unimpeded wholly above a level of an axis of an axle of said wheel assembly directly upon a major primary vehicle-drag-inducing portion of forward-facing upper circumferential surfaces of a tire of said forwardmost wheel, comprising:
forming a deflector panel assembly comprising one or more aerodynamic panels;
attaching the deflector panel assembly to a nonrotatable structural member of a frame or a body of the vehicle wherein the deflector panel assembly extends underneath the vehicle body while also being disposed upstream immediately in front of a trailing wheel set wherein the trailing wheel set comprises one or more of the forwardmost wheels located on one of either lateral side of the vehicle;
arranging the deflector panel assembly itself to be disposed wherein all headwind-exposed wholly planar portions thereof that are also located no higher than the level of the axis of the axle are each disposed in a substantially non-horizontal orientation with respect to the ground;
arranging the deflector panel assembly itself to be further disposed no further forward on the vehicle than a forwardmost vehicle landing gear extending downwards underneath the vehicle body;
arranging one or more of the aerodynamic panels to be disposed immediately upstream and aligned directly in front of the trailing wheel set wherein the deflector panel assembly comprises a critically aligned upstream section of the one or more of the aerodynamic panels consisting of each portion of said aerodynamic panels that is disposed immediately ahead of and is aligned horizontally level with and is aligned directly in front of any forward-facing circumferential tire surface of said trailing wheel set;
arranging the critically aligned upstream section itself to be disposed for a portion thereof to be aligned horizontally level with a critical vehicle-drag-inducing wheel surface of the trailing wheel set wherein the critical vehicle-drag-inducing wheel surface itself comprises a primary drag-inducing portion of a major upper drag-inducing surface of the trailing wheel set that is located forward of the axle while also being centered about the level of a critical elevation that is itself centered in elevation about the major upper drag-inducing surface and wherein the major upper drag-inducing surface itself comprises a portion of circumferential upper wheel surfaces that is centered around highly sensitive vehicle drag-inducing wheel surfaces located in the forward upper quadrant of the trailing wheel set;

arranging the critically aligned upstream section to span across the level of the critical elevation wherein the critical elevation is positioned not lower than a level in elevation above the ground equal to 70 percent of the outer diameter of the trailing wheel set and wherein the critical wheel surface extends downward nowhere lower than a minimum level in elevation above the ground equal to 60 percent of the outer diameter of the trailing wheel set;

arranging the critically aligned upstream section to be further disposed for a major portion thereof to further comprise a portion of the critically aligned upstream section spanning from in-between a top edge and a bottom edge of the critically aligned upstream section to itself further span laterally a sufficient distance across the vehicle in front of the trailing wheel set to thereby extend said major portion of the critically aligned upstream section itself laterally across distinctly more than halfway across a lateral distance equal to the full lateral width of the trailing wheel set;

arranging the critically aligned upstream section to further extend nowhere lower than a downward level positioned not lower in elevation above the ground than a lowermost level that is itself located at an elevation above the ground wherein a major portion of forward-facing circumferential tire surfaces of the trailing wheel set that are located below the level of the axis of the axle remains exposed to headwinds impinging thereon whereby the most propulsory mechanically disadvantaged forward-facing circumferential tire surfaces are located below the lowermost level and are thereby largely exposed to headwinds that are deflected downwards by the critically aligned upstream section;

arranging the critically aligned upstream section to be further disposed immediately adjacent to the trailing wheel set to thereby deflect a substantial portion of the headwind downward onto exposed forward-facing circumferential tire surfaces of said trailing wheel set; and arranging the critically aligned upstream section to be limited in overall drag-inducing surface extension by the critically aligned upstream section itself extending no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause a vehicle propulsory counterforce itself to increase above an amount required when the critically aligned upstream section is otherwise absent from the vehicle wherein the vehicle propulsory counterforce is the propulsive force required to countervail an overall vehicle drag force consisting of a net wheel drag force upon the trailing wheel set as magnified against the axle combined with a critical deflector drag force induced solely from headwinds impinging upon the critically aligned upstream section of the deflector panel assembly, whereby any effective reduction in drag upon said trailing wheel set as reflected through the vehicle frame and thereby as countervailed by vehicle propulsive counterforces is not less than the offsetting effective vehicle drag induced by the critically aligned upstream section itself being directly attached to the vehicle frame and whereby the deflector panel assembly can be disposed to yield an increase in vehicle propulsive efficiency exceeding any decrease in vehicle propulsive efficiency caused by any increased drag on the mechanically de-magnified lower wheel surfaces combined with any drag induced upon the deflector panel assembly itself.

54. The method of claim 53, wherein the lowermost level is located at an elevation above the ground equal to one-third of the outer diameter of the trailing wheel set.

55. The method of claim 54, wherein:

the critically aligned upstream section is arranged to be further disposed immediately adjacent to the trailing wheel set at a forwardly inclined angle to deflect a major portion of the headwind both downward and rearward onto exposed forward-facing circumferential tire surfaces of said trailing wheel set;

a rearmost portion of the critically aligned upstream section is arranged to be disposed within a minimum upstream distance ahead of the trailing wheel set equal to 100 percent of the outer diameter of said trailing wheel set; and the critically aligned upstream section is arranged to be further disposed no further forward than within a maximum upstream distance ahead of the trailing wheel set equal to 400 percent of the outer diameter of said trailing wheel set.

56. The method of claim 55, wherein:

the deflector panel assembly is arranged to be further disposed wholly on one of either lateral side of the vehicle; and the critically aligned upstream section is arranged to be limited in total length spanning a distance along the forward direction of the vehicle to that which is no greater than that equal to 350 percent of the outer diameter of the trailing wheel set.

57. The method of claim 56, wherein the deflector panel assembly is arranged to be limited in lateral width to the lateral width of the critically aligned upstream section.

58. The method of claim 54, further comprising:

a plurality of lateral end plates arranged wherein each said end plate is attached to a lateral side of one of the one or more critically aligned upstream sections and arranged parallel to the lengthwise sides of the vehicle body while also projecting forwardly to form a channel within said deflector panel assembly;

the critically aligned upstream section arranged to have one said end plate attached to the outermost lateral side thereof wherein the outermost lateral side is that side of the upstream section that is positioned nearest the outer lateral side of the vehicle body corresponding thereto;

the critically aligned upstream section arranged to be further disposed immediately adjacent to the trailing wheel set at a forwardly inclined angle to deflect and channel a major portion of the headwind both downward and rearward onto exposed forward-facing circumferential tire surfaces of said trailing wheel set;

a rearmost portion of the critically aligned upstream section arranged to be disposed within a minimum upstream distance ahead of the trailing wheel set equal to 100 percent of the outer diameter of said trailing wheel set; and the critically aligned upstream section arranged to be further disposed no further forward than within a maximum upstream distance ahead of the trailing wheel set equal to 400 percent of the outer diameter of said trailing wheel set.

59. The method of claim 58, wherein:

the deflector panel assembly is arranged to be disposed wholly on one of either lateral side of the vehicle; and the critically aligned upstream section is arranged to be limited in total length spanning a distance along the forward direction of the vehicle to no greater than that equal to 350 percent of the outer diameter of the trailing wheel set.

60. The method of claim 54, wherein:

the deflector panel assembly is arranged to be further disposed in a substantially vertical orientation;

the deflector panel assembly is arranged to be disposed wholly within an upstream distance ahead of the trailing wheel set equal to 50 percent of the outer diameter of said trailing wheel set; and the deflector panel assembly is arranged to be limited in lateral width to the lateral width of the critically aligned upstream section.

61. The method of claim 53, wherein the deflector panel assembly is arranged to be further disposed wholly on one of either lateral side of the vehicle.

62. The method of claim 61, further comprising:

arranging the deflector panel assembly to be further disposed wholly on one lateral side apart from a longitudinal centerline of the vehicle body;

arranging the deflector panel assembly wherein a wind-deflecting portion thereof consisting of each portion of the deflector panel assembly that is disposed wholly forward of the wheel set being itself further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the trailing wheel set wherein the deflector panel assembly comprises a vehicle body skirt assembly disposed lengthwise largely along a longitudinal side of the vehicle; and arranging said wind-deflecting portion to be disposed to progress steadily laterally outward away from the longitudinal centerline along the major length thereof from the forward wind-deflecting portion end thereof to the rearward wind-deflecting portion end thereof.

63. The method of claim 62, wherein said major portion of the critically aligned upstream section is arranged to span laterally across no less than 75 percent of the distance across the full lateral width of the trailing wheel set.

64. The method of claim 62, wherein said major portion of the critically aligned upstream section is arranged to span laterally across no less than the full lateral width of the trailing wheel set.

65. The method of claim 61, further comprising;

arranging the deflector panel assembly to be further disposed wholly on one lateral side apart from a longitudinal centerline of the vehicle body;

arranging the deflector panel assembly to further comprise a wind-deflecting portion thereof consisting of each portion of the deflector panel assembly that is disposed wholly forward of the wheel set wherein the wind-deflecting portion itself comprises two or more of said upstream panels;

arranging the deflector panel assembly wherein the wind-deflecting portion itself being further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the wheel set and with an intermediate wind-deflecting portion thereof further comprising an angled intersection between the two or more said upstream panels wherein the angled intersection itself is located in-between the forward wind-deflecting portion end and the rearward wind-deflecting portion end and wherein the deflector panel assembly thereby comprises a vehicle body skirt assembly disposed lengthwise largely along a longitudinal side of the vehicle; and arranging the rearmost of the two or more said upstream panels to progress steadily laterally outward away from the longitudinal centerline along the major length thereof while extending from a forward panel end thereof to a rearward panel end thereof.

66. The method of claim 61, wherein said major portion of the critically aligned upstream section is arranged to span laterally across no less than the full lateral width of the trailing wheel set.

67. The method of claim 61, wherein the lowermost level is located at an elevation above the ground equal to 25 percent of the outer diameter of the trailing wheel set.

68. The method of claim 67, wherein said major portion of the critically aligned upstream section is arranged to span laterally across no less than the full lateral width of the trailing wheel set.

69. The method of claim 61, wherein the lowermost level is located at an elevation above the ground equal to 40 percent of the outer diameter of the trailing wheel set.

70. The method of claim 69, wherein said major portion of the critically aligned upstream section is arranged to span laterally across no less than the full lateral width of the trailing wheel set.

71. The method of claim 61, wherein the deflector panel assembly is arranged to be further disposed wholly within a maximum upstream distance ahead of the trailing wheel set wherein the maximum upstream distance is equal to the greater either of two-thirds of the distance in-between said trailing wheel set and the forwardmost vehicle landing gear or of a distance equal to 500 percent of the outer diameter of said trailing wheel set.

72. The method of claim 71, wherein said major portion of the critically aligned upstream section is arranged to span laterally across no less than the full lateral width of the trailing wheel set.

73. The method of claim 72, wherein the lowermost level is located at an elevation above the ground equal to 25 percent of the outer diameter of the trailing wheel set.

74. The method of claim 71, wherein the lowermost level is located at an elevation above the ground equal to 25 percent of the outer diameter of the trailing wheel set.

75. The method of claim 71, wherein the lowermost level is located at an elevation above the ground equal to 40 percent of the outer diameter of the trailing wheel set.

76. The method of claim 53, further comprising:
arranging the deflector panel assembly wherein on an otherwise exposed upper outer lateral side of the trailing wheel set said deflector panel assembly further comprising a wheel skirt panel located immediately adjacent to the exposed outer lateral side of the wheel assembly with the adjacent wheel skirt panel itself comprising only deflector panel assembly surfaces located wholly on the same corresponding side of said wheel assembly and further comprising said wheel skirt panel extending downward nowhere lower in elevation above the ground than a lower skirt level that is itself positioned at the axis of the axle; and
arranging the adjacent wheel skirt panel itself to further extend no further downwards and no further forward or rearward of the trailing wheel set than when taken all together while the vehicle is operated at 65 km/h under null wind conditions increased drag induced upon increasingly extended surfaces of the adjacent wheel skirt panel would then more than fully offset reduced effective drag on corresponding adjacent surfaces of said trailing wheel set and would thereby cause propulsive efficiency of the vehicle to decrease below an amount at which the adjacent wheel skirt panel were otherwise absent from the vehicle.

77. The method of claim 53, wherein the critically aligned upstream section is arranged to be disposed to sufficiently extend no further downwards and no further forward of the trailing wheel set than to an optimal combined forward and downward disposition thereof so that when taken all together while the vehicle is operated at 65 km/h under null wind conditions the vehicle propulsory counterforce is minimized.

78. A combination of a vehicle having a vehicle body supported thereunder by a forwardmost wheel of a wheel assembly otherwise exposed to headwinds impinging substantially unimpeded wholly above a level an axis of an axle of the wheel assembly directly upon forward-facing upper circumferential surfaces of a tire of the forwardmost wheel of a wheel set located on one of either lateral side of the vehicle while the vehicle is in forward motion under a range of external headwind conditions including null headwind conditions and an aerodynamic deflector panel for increasing propulsive efficiency of the vehicle wherein:
the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly;
any drag force directed upon the aerodynamic deflector panel is directed equally against a frame or the body of the vehicle;
said deflector panel diverts headwinds from otherwise impinging directly upon a major portion of the primary vehicle-drag-inducing upper wheel surfaces of forward-facing circumferential surfaces of the wheel set that are located above the level of the axis of the axle by said deflector panel diverting a major portion of oncoming headwinds otherwise impinging substantially unimpeded directly upon said major portion of the forward-facing circumferential primary vehicle-drag-inducing upper wheel surfaces downwards onto any portion of forward-facing circumferential tire surfaces of the wheel set that are located below a level in elevation above the ground equal to one-third of the outer diameter of the wheel set and wherein any headwinds downwardly diverted by said deflector panel thereafter remain dispersively uncompressed against the ground by said deflector panel before impinging upon forward-facing circumferential tire surfaces of the wheel set;
any drag force directed against the frame or the body of the vehicle that is induced by said deflector panel itself in diverting headwinds is itself sufficiently limited in magnitude that while the vehicle is operated at 50 km/h under null wind conditions said deflector panel also diverts a sufficient portion of the major portion of oncoming headwinds otherwise impinging substantially unimpeded directly upon said major portion of the forward-facing circumferential primary vehicle-drag-inducing upper wheel surfaces downwardly onto lower wheel surfaces to thereby yield both sufficiently reduced drag on the primary vehicle-drag-inducing upper wheel surfaces of the wheel set and sufficiently limited increased drag upon lower wheel surfaces of the wheel set
wherein a vehicle propulsory counterforce is reduced in comparison to that at which the deflector panel neither diverts any headwinds nor induces any drag on the frame or the body of the vehicle wherein the vehicle propulsory counterforce is the propulsive force required to countervail an overall vehicle drag force consisting of a net wheel drag force upon the wheel set as magnified against the axle combined with an effective vehicle frame drag force induced by said deflector panel itself in diverting said major portion of oncoming headwinds;
and said deflector panel being selected from the group of elements consisting of a first element comprising:
said deflector panel diverting a major portion of oncoming headwinds otherwise impinging substantially unimpeded directly upon said major portion of the primary vehicle-drag-inducing upper wheel surfaces both downward and rearward in substantially similar measure; and
said deflector panel permitting headwinds impinging vehicle surfaces located substantially centered in-between the wheel sets to impinge directly thereon,
a second element comprising
said deflector panel diverting both a major portion of oncoming headwinds otherwise impinging substantially unimpeded directly upon said major portion of the primary vehicle-drag-inducing upper wheel surfaces and substantial headwinds otherwise impinging vehicle surfaces located directly in-between the wheel sets both downward and rearward in substantially similar measure,
a third element comprising:
said deflector panel diverting a major portion of oncoming headwinds otherwise impinging substantially unimpeded directly upon said major portion of the primary vehicle-drag-inducing upper wheel surfaces both downward and rearward in substantially similar measure wherein said substantial portion of oncoming headwinds otherwise impinging substantially unimpeded directly upon said major portion of the primary vehicle-drag-inducing upper wheel surfaces is substantially contained within a largely non-dispersive flow stream where immediately diverted by said deflector panel; and
said deflector panel permitting headwinds impinging vehicle surfaces located substantially centered in-between the wheel sets to impinge directly thereon, a fourth element comprising
    said deflector panel diverting both a major portion of oncoming headwinds otherwise impinging substantially unimpeded directly upon said major portion of the primary vehicle-drag-inducing upper wheel surfaces and substantial headwinds otherwise impinging vehicle surfaces located directly in-between the wheel sets both downward and rearward in substantially similar measure wherein said substantial portion of oncoming headwinds otherwise impinging upon said major portion is substantially contained within a largely non-dispersive flow stream where immediately diverted by said deflector panel,
a fifth element comprising:
    said deflector panel diverting said substantial portion of oncoming headwinds otherwise impinging substantially unimpeded directly upon said major portion of the primary vehicle-drag-inducing upper wheel surfaces substantially more downward than rearward; and
    said deflector panel permitting headwinds impinging vehicle surfaces located substantially centered in-between the wheel sets to impinge directly thereon,
a sixth element comprising
    said deflector panel diverting both said substantial portion of oncoming headwinds otherwise impinging substantially unimpeded directly upon said major portion of the primary vehicle-drag-inducing upper wheel surfaces and substantial headwinds otherwise impinging vehicle surfaces located directly in-between the wheel sets substantially more downward than rearward,
and a seventh element comprising
    said deflector panel diverting both said substantial portion of oncoming headwinds otherwise impinging substantially unimpeded directly upon said major portion of the primary vehicle-drag-inducing upper wheel surfaces and substantial headwinds otherwise impinging vehicle surfaces located directly in-between the wheel sets both substantially downward and substantially laterally outward, and rearward.

79. The combination of claim 78, wherein said deflector panel is selected as the first element of the group of elements.

80. The combination of claim 78, wherein said deflector panel is selected as the second element of the group of elements.

81. The combination of claim 78, wherein said deflector panel is selected as the third element of the group of elements.

82. The combination of claim 78, wherein said deflector panel is selected as the fourth element of the group of elements.

83. The combination of claim 78, wherein:
said deflector panel is selected as the fifth element of the group of elements; and
said deflector panel diverts substantially all oncoming headwinds from otherwise impinging substantially unimpeded directly upon the primary vehicle-drag-inducing upper wheel surfaces wherein a substantial portion of said diverted oncoming headwinds is diverted downwards onto a major portion of forward-facing circumferential tire surfaces of the wheel set that are located below the level of the axis of the axle.

84. The combination of claim 78, wherein:
said deflector panel is selected as the sixth element of the group of elements; and
said deflector panel diverts substantially all oncoming headwinds from otherwise impinging substantially unimpeded directly upon the primary vehicle-drag-inducing upper wheel surfaces wherein a substantial portion of said diverted oncoming headwinds is diverted downwards onto a major portion of forward-facing circumferential tire surfaces of the wheel set that are located below the level of the axis of the axle.

85. The combination of claim 78, wherein:
said deflector panel is selected as the seventh element of the group of elements; and
said deflector panel diverts substantially all oncoming headwinds from otherwise impinging substantially unimpeded directly upon the primary vehicle-drag-inducing upper wheel surfaces wherein a substantial portion of said diverted oncoming headwinds is diverted downwards onto a major portion of forward-facing circumferential tire surfaces of the wheel set that are located below the level of the axis of the axle.

86. The combination of claim 78, wherein said deflector panel diverts solely a sufficient portion of said major portion of oncoming headwinds wherein the vehicle propulsory counterforce is minimized while the vehicle is operated at 50 km/h under null wind conditions.

87. A method for reducing propulsory counterforces required to countervail drag-induced resistive forces upon a terrestrial vehicle having a vehicle body supported thereunder by a forwardmost wheel of a wheel assembly wherein the forwardmost wheel is any rearward wheel not immediately preceded by another wheel disposed in-line directly ahead of said forwardmost wheel within an intervening distance ahead of said forwardmost wheel that is not more than that equal to the outer diameter of the wheel assembly and wherein when the vehicle is in forward motion under a range of external headwind conditions including null headwind conditions the wheel assembly is otherwise exposed to an oncoming headwind impinging substantially unimpeded wholly above a level of an axis of an axle of said wheel assembly directly upon a major primary vehicle-drag-inducing portion of forward-facing upper circumferential surfaces of a tire of said forwardmost wheel, comprising:
    forming a deflector panel assembly comprising one or more aerodynamic panels;
    attaching the deflector panel assembly to a nonrotatable structural member of a frame or a body of the vehicle wherein the deflector panel assembly extends underneath the vehicle body while also being disposed upstream immediately in front of a trailing wheel set wherein the trailing wheel set comprises one or more of the forwardmost wheels located on one of either lateral side of the vehicle;
    arranging the deflector panel assembly to be disposed wherein all headwind-exposed wholly planar portions thereof that are also located no higher than the level of the axis of the axle are each disposed in a substantially non-horizontal orientation with respect to the ground;
    arranging the deflector panel assembly to be further disposed no further forward on the vehicle than a forwardmost vehicle landing gear extending downwards underneath the vehicle body;
    arranging one or more of the aerodynamic panels to be disposed immediately upstream and aligned directly in front of the trailing wheel set wherein the deflector panel assembly comprises a critically aligned upstream section of the one or more of the aerodynamic panels consisting of each portion of said aerodynamic panels that is disposed immediately ahead of and is aligned horizontally level with and is aligned directly in front of any forward-facing circumferential tire surface of said trailing wheel set;

arranging the critically aligned upstream section itself to be disposed for a portion thereof to be aligned horizontally level with a critical vehicle-drag-inducing wheel surface of the trailing wheel set wherein the critical vehicle-drag-inducing wheel surface itself comprises a primary drag-inducing portion of a major upper drag-inducing surface of the trailing wheel set that is located forward of the axle while also being centered about the level of a critical elevation that is itself centered in elevation about the major upper drag-inducing surface and wherein the major upper drag-inducing surface itself comprises a portion of circumferential upper wheel surfaces that is centered around highly sensitive vehicle drag-inducing wheel surfaces located in the forward upper quadrant of the trailing wheel set;

arranging the critically aligned upstream section to span across the level of the critical elevation wherein the critical elevation is positioned not lower than a level in elevation above the ground equal to 70 percent of the outer diameter of the trailing wheel set and wherein the critical wheel surface extends downward nowhere lower than a minimum level in elevation above the ground equal to 60 percent of the outer diameter of the trailing wheel set;

arranging the critically aligned upstream section to be further disposed for a major portion thereof to further comprise a portion of the critically aligned upstream section spanning from in-between a top edge and a bottom edge of the critically aligned upstream section to itself further span laterally a sufficient distance across the vehicle in front of the trailing wheel set to thereby extend said major portion of the critically aligned upstream section itself laterally across distinctly more than halfway across a lateral distance equal to the full lateral width of the trailing wheel set;

arranging the critically aligned upstream section to further extend nowhere lower than a downward level positioned not lower in elevation above the ground than a lowermost level that is itself located at an elevation above the ground wherein a major portion of forward-facing circumferential tire surfaces of the trailing wheel set that are located below the level of the axis of the axle remains exposed to headwinds impinging thereon whereby the most propulsory mechanically disadvantaged forward-facing circumferential tire surfaces are located below the lowermost level and are thereby largely exposed to headwinds that are deflected downwards by the critically aligned upstream section;

arranging the critically aligned upstream section to be further disposed immediately adjacent to the trailing wheel set to thereby deflect a substantial portion of the headwind downward onto exposed forward-facing circumferential tire surfaces of said trailing wheel set that are located lower than the downward level;

arranging the critically aligned upstream section to be limited in overall drag-inducing surface extension by the critically aligned upstream section itself extending no further downwards and no further forward of the trailing wheel set than to a combined forward and downward disposition thereof so that when taken all together while the vehicle is operated at 65 km/h under null wind conditions any further surface extension of the critically aligned upstream section would further increase drag induced thereon beyond a critical amount to cause a vehicle propulsory counterforce itself to increase above an amount required when the critically aligned upstream section is otherwise absent from the vehicle wherein the vehicle propulsory counterforce is the propulsive force required to countervail an overall vehicle drag force consisting of a net wheel drag force upon the trailing wheel set as magnified against the axle combined with a critical deflector drag force induced solely from headwinds impinging upon the critically aligned upstream section of the deflector panel assembly;

arranging the deflector panel assembly wherein on an otherwise exposed upper outer lateral side of the trailing wheel set that also has any portion of the deflector panel assembly disposed proximately adjacent thereto said deflector panel assembly further comprising a wheel skirt panel located immediately adjacent to the exposed outer lateral side of the wheel assembly with the adjacent wheel skirt panel itself comprising only deflector panel assembly surfaces located wholly on the same corresponding side of said wheel assembly and further comprising said wheel skirt panel extending downwards nowhere lower in elevation above the ground than a lower skirt level that is itself positioned at the axis of the axle and further comprising the adjacent wheel skirt panel itself extending no further downwards and no further forward or rearward of the trailing wheel set than when taken all together while the vehicle is operated at 65 km/h under null wind conditions increased drag induced upon increasingly extended surfaces of the adjacent wheel skirt panel would then more than fully offset reduced effective drag on corresponding adjacent surfaces of said trailing wheel set and would thereby cause propulsive efficiency of the vehicle to decrease below an amount at which the adjacent wheel skirt panel were otherwise absent from the vehicle; and the method selected from the group of elements consisting of a first element comprising:

arranging the deflector panel assembly to be further disposed wholly on one of either lateral side of the vehicle while also being limited in lateral width to the lateral width of the critically aligned upstream section;

arranging the critically aligned upstream section itself wherein the lowermost level is located at an elevation above the ground equal to one-third of the outer diameter of the trailing wheel set;

arranging the critically aligned upstream section to be further disposed immediately adjacent to the trailing wheel set at a forwardly inclined angle to deflect a major portion of the headwind downward and rearward onto exposed forward-facing circumferential tire surfaces of said trailing wheel set;

arranging a rearmost portion of the critically aligned upstream section to be disposed within a minimum upstream distance ahead of the trailing wheel set equal to 100 percent of the outer diameter of said trailing wheel set;

arranging the critically aligned upstream section to be further disposed no further forward than within a maximum upstream distance ahead of the trailing wheel set equal to 400 percent of the outer diameter of said trailing wheel set; and arranging the critically aligned upstream section to be limited in total length spanning a distance along the forward direction of the vehicle to no greater than that equal to 350 percent of the outer diameter of the trailing wheel set, a second element comprising:
 arranging the deflector panel assembly to extend laterally underneath and across the major lateral width of the vehicle body;
 arranging the critically aligned upstream section wherein the lowermost level is located at an elevation above the ground equal to one-third of the outer diameter of the trailing wheel set;
 arranging the critically aligned upstream section to be further disposed immediately adjacent to the trailing wheel set at a forwardly inclined angle to deflect a major portion of the headwind downward and rearward onto exposed forward-facing circumferential tire surfaces of said trailing wheel set;
 arranging a rearmost portion of the critically aligned upstream section to be disposed within a minimum upstream distance ahead of the trailing wheel set equal to 100 percent of the outer diameter of said trailing wheel set;
 arranging the critically aligned upstream section to be further disposed no further forward than within a maximum upstream distance ahead of the trailing wheel set equal to 400 percent of the outer diameter of said trailing wheel set; and
 arranging the critically aligned upstream section to be limited in total length spanning a distance along the forward direction of the vehicle to no greater than that equal to 350 percent of the outer diameter of the trailing wheel set, a third element comprising:
 arranging the deflector panel assembly to be further disposed wholly on one of either lateral side of the vehicle;
 arranging the deflector panel assembly wherein any portion thereof that is disposed forward of the wheel set being limited in lateral width to the lateral width of the critically aligned upstream section;
 arranging the deflector panel assembly to further comprise a plurality of lateral end plates with each said end plate attached to one of either of the lateral sides of the critically aligned upstream section and arranged parallel to the lengthwise sides of the vehicle body while also projecting forwardly to form a channel within the deflector panel assembly;
 arranging the critically aligned upstream section itself to be further disposed immediately adjacent to the trailing wheel set at a forwardly inclined angle to deflect and channel a major portion of the headwind downward and rearward onto exposed forward-facing circumferential tire surfaces of said trailing wheel set;
 arranging a rearmost portion of the critically aligned upstream section to be disposed within a minimum upstream distance ahead of the trailing wheel set equal to 100 percent of the outer diameter of said trailing wheel set;
 arranging the critically aligned upstream section to be further disposed no further forward than within a maximum upstream distance ahead of the trailing wheel set equal to 400 percent of the outer diameter of said trailing wheel set; and
 arranging the critically aligned upstream section to be limited in total length spanning a distance along the forward direction of the vehicle to no greater than that equal to 350 percent of the outer diameter of the trailing wheel set, a fourth element comprising:
 arranging the deflector panel assembly to extend laterally underneath and across the major lateral width of the vehicle body;
 arranging the deflector panel assembly to further comprise a plurality of lateral end plates with each said end plate attached to one of either of the lateral sides of the deflector panel assembly and arranged parallel to the lengthwise sides of the vehicle body while also projecting forwardly to form a channel within the deflector panel assembly;
 arranging the critically aligned upstream section to be further disposed immediately adjacent to the trailing wheel set at a forwardly inclined angle to deflect and channel a major portion of the headwind downward and rearward onto exposed forward-facing circumferential tire surfaces of said trailing wheel set;
 arranging a rearmost portion of the critically aligned upstream section to be disposed within a minimum upstream distance ahead of the trailing wheel set equal to 100 percent of the outer diameter of said trailing wheel set;
 arranging the critically aligned upstream section to be further disposed no further forward than within a maximum upstream distance ahead of the trailing wheel set equal to 400 percent of the outer diameter of said trailing wheel set; and
 arranging the critically aligned upstream section to be limited in total length spanning a distance along the forward direction of the vehicle to no greater than that equal to 350 percent of the outer diameter of the trailing wheel set, a fifth element comprising:
 arranging the deflector panel assembly to be further disposed wholly on one of either lateral side of the vehicle;
 arranging the deflector panel assembly to be suspended in a substantially vertical orientation;
 arranging the deflector panel assembly wherein any portion thereof that is disposed forward of the wheel set being limited in lateral width to the lateral width of the critically aligned upstream section; and
 arranging the deflector panel assembly to be further disposed wholly within an upstream distance ahead of the trailing wheel set equal to 50 percent of the outer diameter of said trailing wheel set, a sixth element comprising:
 arranging the lowermost level to be located at the axis of the axle;
 arranging the deflector panel assembly to be suspended in a substantially vertical orientation;
 arranging the deflector panel assembly to extend laterally underneath and across the major lateral width of the vehicle body; and
 arranging the deflector panel assembly to be further disposed wholly within an upstream distance ahead of the trailing wheel set equal to 100 percent of the outer diameter of said trailing wheel set, a seventh element comprising:
 arranging the deflector panel assembly to be further disposed wholly on one lateral side apart from a longitudinal centerline of the vehicle body;
 arranging the deflector panel assembly wherein a wind-deflecting portion thereof consisting of each portion of the deflector panel assembly that is disposed wholly forward of the wheel set being itself further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the trailing wheel set wherein the deflector panel assembly comprises a vehicle body skirt assembly disposed lengthwise largely along a longitudinal side of the vehicle; and arranging said wind-deflecting portion to be disposed to progress steadily laterally outward away from the longitudinal centerline along the major length thereof from the forward wind-deflecting portion end thereof to the rearward wind-deflecting portion end thereof, and an eighth element comprising:

arranging the deflector panel assembly to be further disposed wholly on one lateral side apart from a longitudinal centerline of the vehicle body;

arranging the deflector panel assembly to further comprise a wind-deflecting portion thereof consisting of each portion of the deflector panel assembly that is disposed wholly forward of the wheel set wherein the wind-deflecting portion itself comprises two or more of said upstream panels;

arranging the deflector panel assembly wherein the wind-deflecting portion itself being further disposed with a forward wind-deflecting portion end thereof being located substantially ahead of the trailing wheel set toward the vehicle landing gear and substantially inboard toward the longitudinal centerline and with a rearward wind-deflecting portion end thereof being located substantially outboard near to the outside lateral surface of the outermost wheel of the wheel set and with an intermediate wind-deflecting portion thereof further comprising an angled intersection between the two or more said upstream panels wherein the angled intersection itself is located in-between the forward wind-deflecting portion end and the rearward wind-deflecting portion end and wherein the deflector panel assembly thereby comprises a vehicle body skirt assembly disposed lengthwise largely along a longitudinal side of the vehicle;

arranging the rearmost of the two or more said upstream panels to progress steadily laterally outward away from the longitudinal centerline along the major length thereof while extending from a forward panel end thereof to a rearward panel end thereof; and arranging the forwardmost of the two or more said upstream panels wherein a forward panel end thereof is disposed laterally outward no further from the centerline of the vehicle body than a rearward panel end thereof, whereby any effective reduction in drag upon said trailing wheel set as reflected through the vehicle frame and thereby as countervailed by vehicle propulsive counterforces is not less than the offsetting effective vehicle drag induced by the critically aligned upstream section itself being directly attached to the vehicle frame and whereby the deflector panel assembly can be disposed to yield an increase in vehicle propulsive efficiency exceeding any decrease in vehicle propulsive efficiency caused by any increased drag on the mechanically de-magnified lower wheel surfaces combined with drag induced upon the deflector panel assembly itself.

* * * * *